United States Patent
Kitaguchi

(10) Patent No.: US 10,491,757 B2
(45) Date of Patent: Nov. 26, 2019

(54) IMAGE PROCESSING DEVICE, IMAGE PROCESSING SYSTEM, AND PROGRAM

(71) Applicant: KONICA MINOLTA, INC., Tokyo (JP)

(72) Inventor: Tatsuya Kitaguchi, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/998,521

(22) Filed: Aug. 16, 2018

(65) Prior Publication Data

US 2019/0075207 A1 Mar. 7, 2019

(30) Foreign Application Priority Data

Sep. 6, 2017 (JP) .................. 2017-171101

(51) Int. Cl.
*H04N 1/00* (2006.01)

(52) U.S. Cl.
CPC ....... *H04N 1/00084* (2013.01); *H04N 1/0009* (2013.01); *H04N 1/00037* (2013.01); *H04N 1/00079* (2013.01); *H04N 1/00244* (2013.01)

(58) Field of Classification Search
CPC .......... H04N 1/00084; H04N 1/00244; H04N 1/00037; H04N 1/00079; H04N 1/0009
USPC ....................................... 358/1.14
See application file for complete search history.

(56) References Cited

U.S. PATENT DOCUMENTS

2005/0088709 A1* 4/2005 Kizaki ............... H04N 1/00954
                                                    358/501
2016/0381245 A1* 12/2016 Hirota ................ H04N 1/00384
                                                    358/1.15

FOREIGN PATENT DOCUMENTS

JP     2011192005 A    9/2011

* cited by examiner

*Primary Examiner* — Saeid Ebrahimi Dehkordy
(74) *Attorney, Agent, or Firm* — Buchanan Ingersoll & Rooney PC

(57) ABSTRACT

An image processing device capable of assigning a basic function and a server function to hardware resources and operating the basic function and the server function, includes: a hardware processor that: detects occurrence of a failure related to the basic function or transition to a power saving mode; releases a specific hardware resource corresponding to a function that has become inoperable due to the occurrence of a failure or the transition to a power saving mode, of the basic function assigned to the hardware resources, in a case where the occurrence of a failure or the transition to a power saving mode has been detected by the hardware processor; and additionally assigns the server function to the specific hardware resource released by the hardware processor, of the hardware resources, to operate the server function.

29 Claims, 24 Drawing Sheets

| DETECTION CONTENT | FAILURE CAUSE | RESTORATION TIME REQUIRED |
|---|---|---|
| POWER SAVING MODE TRANSITION | — | 10s |
| FAILURE DETECTION | PAPER JAM IN PRINTER | 100s |
| | TONER EMPTY | 300s |
| | SHEET EMPTY | 60s |
| | PAPER JAM IN SCANNER | 20s |

| SERVER FUNCTION EXPANSION CAUSE | PRIORITY |
|---|---|
| POWER SAVING MODE TRANSITION | 8 |
| PAPER JAM IN PRINTER | 10 |
| TONER EMPTY | 30 |
| SHEET EMPTY | 7 |
| PAPER JAM IN SCANNER | 5 |
| NO EXPANSION | 0 |

IMAGE PROCESSING DEVICE, IMAGE PROCESSING SYSTEM, AND PROGRAM

The entire disclosure of Japanese patent Application No. 2017-171101, filed on Sep. 6, 2017, is incorporated herein by reference in its entirety.

BACKGROUND

Technological Field

The present invention relates to an image processing device, an image processing system, and a program.

Description of the Related Art

In recent years, image processing devices such as multifunction peripherals (MFP) have been provided with server functions in addition to basic functions such as a print function and a scan function. As long as at least one image processing device among a plurality of image processing devices connected to a network such as a local area network (LAN) is equipped with the server functions, another image processing device can use a service provided by the server function by accessing the image processing device equipped with the server functions via the network.

By the way, a failure such as a paper jam may occur in the image processing device during execution of a job related to the basic function such as the print function or the scan function. When the failure occurs in the image processing device, the print function, the scan function, and the like become unavailable due to the failure. The same applies to the image processing device equipped with the server functions.

Meanwhile, the image processing device equipped with the server functions can continue to provide services by the server functions even when a failure has occurred in the basic function. That is, when a failure occurs in the basic function in the image processing device equipped with the server functions, the image processing device operates as a dedicated server device until the failure is resolved. However, there is a problem that, even when the image processing device operates as a dedicated server device, the basic function in which a failure has occurred continues to occupy hardware resources of the image processing device, and thus the processing efficiency of the server functions cannot be improved.

Further, a conventional image processing device is known, which detects a failure that has occurred in each function unit, determines an unexecutable function mode, and notifies a management device of the unexecutable function mode, in order to decrease a waiting time of a job (for example, JP 2011-192005 A). According to this conventional technology, the management device updates a function mode table when acquiring the unexecutable function mode. At this time, the management device raises the priority order of executable functional modes in the image processing device in which the failure has occurred, and lowers the priority order of the function modes in the other normally operating image processing devices. The management device assigns a job on the basis of the priority orders of the image processing devices by reference to the function mode table when receiving the job. According to such a conventional technology, when a failure occurs in a specific function in one image processing device, of a plurality of image processing devices, the one image processing device becomes able to preferentially execute jobs related to functions other than the specific function in which the failure has occurred to the other image processing devices.

In the conventional technology in JP 2011-192005 A, in the case where a failure has occurred in a specific function in one image processing device, of the plurality of image processing devices, jobs related to functions in which no failure has occurred flock into the one image processing device. However, in the above conventional technology, although the image processing device in which a failure has occurred preferentially executes the jobs related to the functions in which no failure has occurred, the image processing device can exhibit only the processing efficiency equivalent to the normal time when executing the jobs in which no failure has occurred. Therefore, even when the jobs related to the functions in which no failure has occurred are preferentially assigned in a state where a failure has occurred in the specific function, the image processing device cannot more efficiently process the jobs than the normal time.

Therefore, even if the above-described conventional technology is applied, the processing efficiency of the server functions cannot be improved in the case where a failure has occurred in the basic function in the image processing device equipped with the basic functions and the server functions.

SUMMARY

Therefore, the present invention has been made to solve the above conventional problems, and an objective is to provide an image processing device, an image processing system, and a program, which enable improvement of the processing efficiency of server functions in a case where a failure or the like has occurred in a basic function.

To achieve the abovementioned object, according to an aspect of the present invention, there is provided an image processing device capable of assigning a basic function and a server function to hardware resources and operating the basic function and the server function, and the image processing device reflecting one aspect of the present invention comprises: a hardware processor that: detects occurrence of a failure related to the basic function or transition to a power saving mode; releases a specific hardware resource corresponding to a function that has become inoperable due to the occurrence of a failure or the transition to a power saving mode, of the basic function assigned to the hardware resources, in a case where the occurrence of a failure or the transition to a power saving mode has been detected by the hardware processor, and additionally assigns the server function to the specific hardware resource released by the hardware processor, of the hardware resources, to operate the server function.

BRIEF DESCRIPTION OF THE DRAWINGS

The advantages and features provided by one or more embodiments of the invention will become more fully understood from the detailed description given hereinbelow and the appended drawings winch are given by way of illustration only, and thus are not intended as a definition of the limits of the present invention:

FIG. 9 is a diagram illustrating an example of prediction information;

FIG. 15 is a diagram illustrating an example of access destination discrimination information;

DETAILED DESCRIPTION OF EMBODIMENTS

Figure 1:
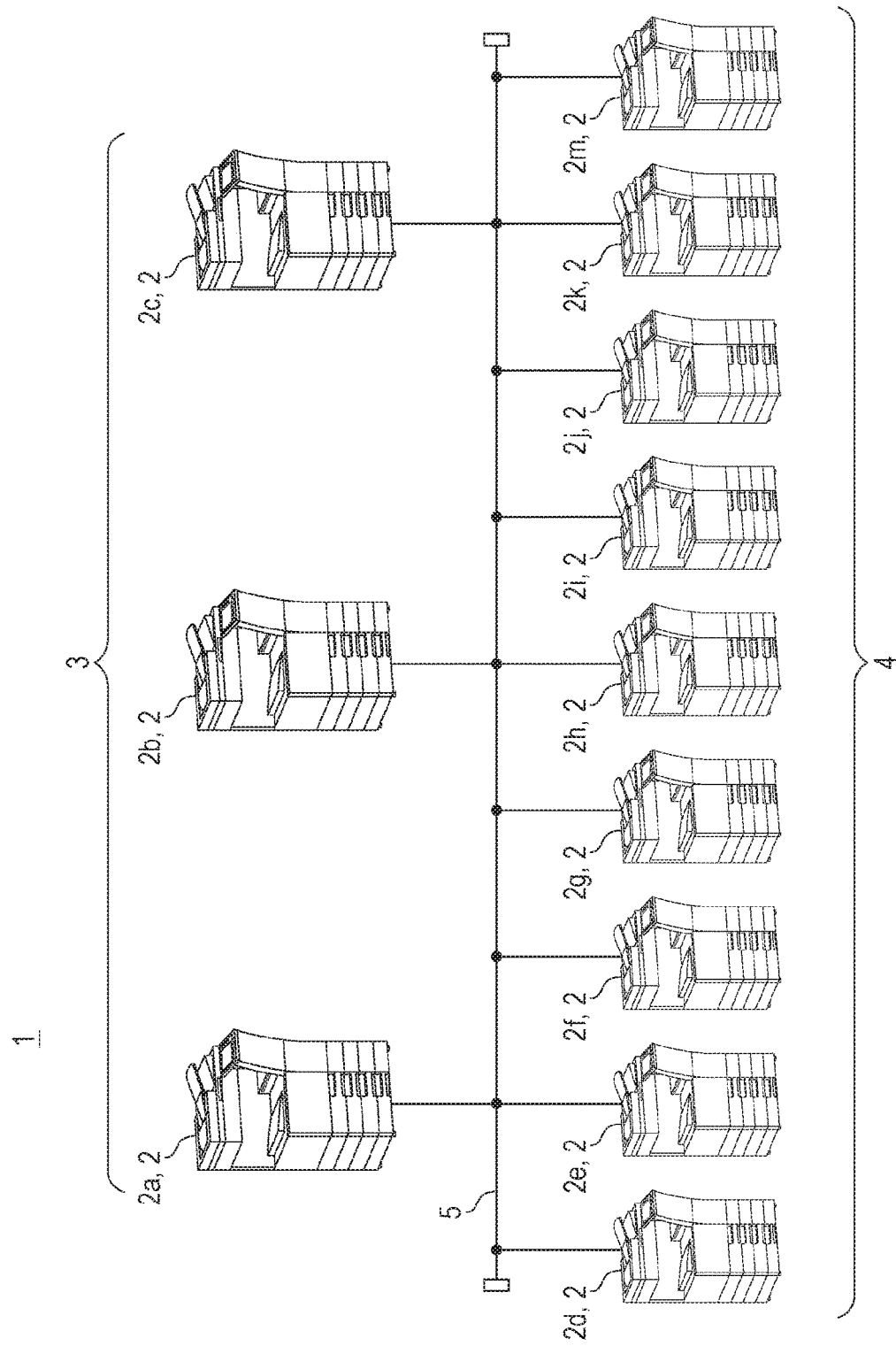
FIG. 1 is a diagram illustrating a configuration example of an image processing system.

Hereinafter, one or more favorable embodiments of the present invention will be described in detail with reference to the drawings. However, the scope of the invention is not limited to the disclosed embodiments. Note that members common to the embodiments to be described below are denoted by the same reference numerals, and overlapping description about the members is omitted.

First Embodiment

First, a first embodiment that is a basic embodiment of the present invention will be described. FIG. 1 is a diagram illustrating a configuration example of an image processing system 1 according to the first embodiment of the present invention. The image processing system 1 has a configuration in which a plurality of image processing devices 2 is connected to a network 5 such as a local area network (LAN. The image processing device 2 is constituted by, for example, an MFP, and has basic functions such as a print function, a scan function, and a FAX function. FIG. 1 illustrates a case where twelve image processing devices 2a to 2m are connected to the network 5 as an example. However, the number of the image processing devices 2 is not limited thereto. A personal computer (PC) (not illustrated) and the like are connected to the network 5, in addition to the plurality of image processing devices 2.

Each of the image processing devices 2a to 2m can execute jobs specified by a user by operating the basic functions. For example, the image processing devices 2a to 2n can execute a copy job, a scan job, a print job, a FAX job, and the like.

The three image processing devices 2a, 2b, and 2c, of the plurality of image processing devices 2a to 2m, are equipped with server functions in addition to the basic functions. Tim server function is a function to receive accesses from other image processing devices 2d to 2m via the network 5 and provide services according to requests to the other image processing devices 2d to 2m. Therefore, the image processing devices 2a, 2b, and 2c respectively function as server devices 3 (also referred to as parent devices) and form a server device group in the image processing system 1.

The server functions in the image processing devices 2a, 2b, and 2c include various functions. For example, in the present embodiment, the image processing devices 2a, 2b, and 2c are equipped with, as the server functions, an authentication function to authenticate a user, an optical character recognition (OCR) function to perform character recognition processing for image data generated by the scan function to generate text data, a translation function to convert text data of a predetermined language into text data of another language, a log collection function to collect log information such as a job execution history from another image processing device 2, and other functions.

On the other hand, the other image processing devices 2d to 2m, which do not have the server functions or which have the server functions but stop the server functions and do not function as servers, function as client devices 4 (also referred to as child devices) and form a client device group in the image processing system 1. The client device 4 can use the service provided by the server function by accessing any one of the plurality of server devices 3 via the network 5. For example, when the image processing device 2d performs user authentication, the image processing device 2d accesses the image processing device 2a and transmits an authentication request, thereby to perform the user authentication using the authentication function of the image processing device 2a.

Figure 2:
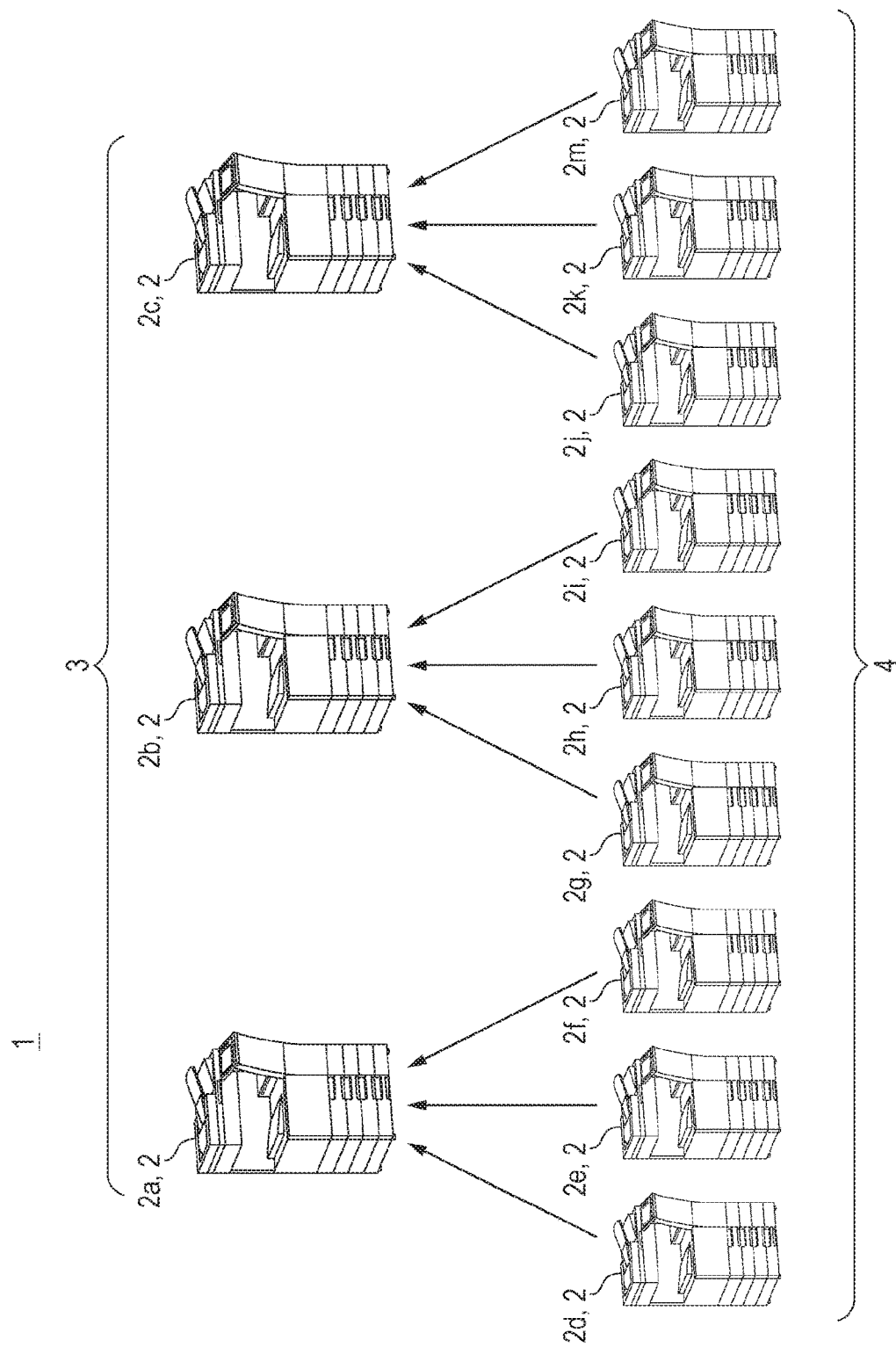
FIG. 2 is a diagram illustrating access destinations of client devices.

In the above-described image processing system 1, when each of the plurality of client devices 4 uses a service provided by the server device 3, the server device 3 that is an access destination is predetermined in advance. FIG. 2 is a diagram illustrating the access destination when the client device 4 accesses the server device 3. As illustrated in FIG. 2, when the image processing devices 2d, 2e, and 2f use the server functions, the image processing devices 2d, 2e, and 2f are determined in advance to access the image processing device 2a and use the server functions in the image processing device 2a. Further, when the image processing devices 2f, 2h, and 2i use the server functions, the image processing devices 2f, 2h, and 2i are determined in advance to access the image processing device 2b and use the server functions in the image processing device 2b. Further, when the image processing devices 2j, 2k, and 2m use the server functions, the image processing devices 2j, 2k, and 2m are determined in advance to access the image processing device 2c and use the server functions in the image processing device 2c. Therefore, the three server devices 3 substantially evenly share the plurality of client devices 4 and provide services by the server functions.

By the way, the image processing devices 2a, 2b, and 2c that function as the server devices 3 execute a copy job, a scan job, a print job, a FAX job, and the like, similarly to the client device 4. Therefore, the image processing devices 2a, 2b, and 2c that function as the server devices 3 sometimes detect occurrence of a failure such as a paper jam during execution of a job. For example, when a paper jam occurs in a sheet conveyance path during execution of the print job in the image processing devices 2a, 2b, and 2c, the image processing devices 2a, 2b, and 2c suspend the execution of the print job. Then, the image processing devices 2a, 2b, and 2c stop the print function until the paper jam is resolved.

Further, the image processing devices 2a, 2b, and 2c that function as the server devices 3 transition to a power saving mode when a non-use state by the user continues for a predetermined time or more, similarly to the client device 4. When transitioning the power mode to the power saving mode, the image processing devices 2a, 2b, and 2c stop power supply to a fixer for fixing a toner image on a print sheet, and the like. Then, the image processing devices 2a, 2b, and 2c stop the print function until the mode is restored from the power saving mode.

The image processing devices 2a, 2b, and 2c that function as the server devices 3 do not need to perform processing based on the print function in a state where the print function is stopped. Further, the same applies to the case where a basic function other than the print function is stopped, the image processing devices 2a, 2b, and 2c do not need to perform processing based on the stopped basic function. Therefore, in the present embodiment, in the image processing devices 2a, 2b, and 2c that function as the server devices 3, the basic function that has become inoperable due to the occurrence of a failure or the transition to the power saving mode is released from a hardware resource, and the server function is additionally operated in the released portion. That is, the server device 3 releases a specific hardware resource corresponding to the function that has become inoperable due to the occurrence of a failure or the transition to the power saving mode, of the hardware resources in which the basic functions and the server functions are operated, and additionally assigns the server function to the released specific hardware resource, thereby to expand the server function. With the expansion, the processing efficiency of the server function can be improved in the server device 3 in which the basic function has become inoperable due to the occurrence of a failure or the transition to the power saving mode. When the processing efficiency of the server function is improved, the server device 3 notifies the client devices 4 that the processing efficiency of the server function has been improved. Thereby, the client devices 4 can change the access destination of when using the server function from the predetermined server device 3 to the server device 3 with the improved processing efficiency. As a result, in the image processing system 1, the processing efficiency when the client devices 4 use the server function can be improved. Hereinafter, such image processing system 1 will be described in more detail.

Figure 3:
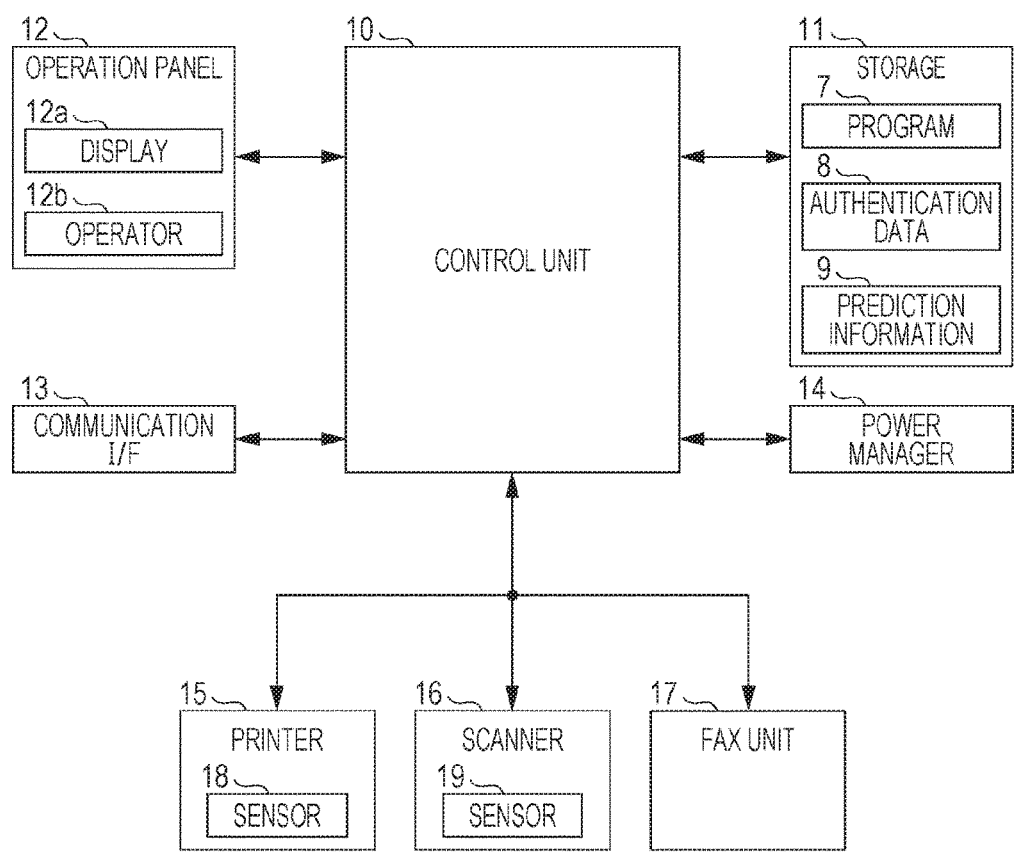
FIG. 3 is a block diagram illustrating an example of a hardware configuration of an image processing device common to a server device and a client device.

FIG. 3 is a block diagram illustrating an example of a hardware configuration of the image processing device 2 common to the server device 3 and the client device 4. The image processing device 2 includes a control unit 10, a storage 11, an operation panel 12, a communication interface 13, a power manager 14, a printer 15, a scanner 16, and a FAX unit 17.

The control unit 10 is a unit for controlling the operation of each part, and includes, for example, a CPU and a memory. In the case where the image processing device 2 is the client device 4, the control unit 10 assigns the basic functions in advance to the hardware resources including the CPU and the memory, and operates only the basic functions. Further, in the case where the image processing device 2 is the server device 3, the control unit 10 assigns the basic functions and the server functions in advance to the hardware resources including the CPU and the memory, and simultaneously operates both the basic functions and the server functions.

The storage 11 is used to store various types of information, and is configured by, for example, a hard disk drive (HDD). The storage 11 stores, for example, a program 7 executed by the CPU of the control unit 10. Further, in the case where the image processing device 2 functions as the server device 3, the storage 11 stores authentication data 8 and prediction information 9 in advance. The authentication data 8 is data for performing user authentication, and is data in which user information such as a user ID and a password is registered in advance. The prediction information 9 is information for predicting a restoration time required for restoration in the case where a failure has occurred or the mode is transitioned to the power saving mode in the server device 3.

The operation panel 12 serves as a user interface when the user uses the image processing device 2, and includes a display 12a and an operator 12b. The display 12a is configured by, for example, a color liquid crystal display, and displays various operation screens to the user. The operator 12b is configured by, for example, a touch panel sensor arranged on a screen of the display 12a, and is used to receive an operation by the user.

The communication interface 13 is used to connect the image processing device 2 to the network 5. The image processing device 2 communicates with another image processing device 2 via the communication interface 13.

The power manager 14 controls power supply to the image processing device 2. For example, in the case where the operation on the operation panel 12 is not performed for a predetermined time or longer, the power manager 14 transitions the power mode of the image processing device 2 to the power saving mode. Further, a state where no job is executed continues for a predetermined time or longer in the image processing devices 2, the power manager 14 transitions the power mode to the power saving mode. Further, when detecting an operation by the user to the operation panel 12 or receiving a job via the communication interface 13 in a state where the power manager 14 is transitioning the power mode to the power saving mode, the power manager 14 cancels the power saving mode to restore the power mode to a normal power supply state.

The printer 15 is operated on the basis of a command from the control unit 10 in the case where a print job is executed in the image processing device 2. The printer 15 conveys a print sheet along a predetermined sheet conveyance path, transfers a toner image when the print sheet passes through a predetermined position and fixes the print sheet to which a toner image has been transferred at the fixer to perform image formation. Such a printer 15 includes a sensor 18. The sensor 18 is a sensor for detecting occurrence of a failure during execution of the print job. For example, the sensor 18 detects various kinds of failures such as a paper jam in the sheet conveyance path, toner empty (out of toner), and sheet empty.

The scanner 16 is operated on the basis of a command from the control unit 10 in the case where a scan job is executed in the image processing device 2. The scanner 16 conveys documents set by the user one by one and optically reads an image when the document passes through a predetermined reading position to generate image data. Such a scanner 16 includes a sensor 19. The sensor 19 is a sensor for detecting occurrence of a failure during execution of the scan job. For example, the sensor 19 detects a paper jam of the document in a document conveyance path as a failure.

The FAX unit 17 transmits and receives FAX data via a public telephone network (not illustrated). For example, when receiving FAX data from an outside, the FAX unit 17 outputs the FAX data to the printer 15 to perform a print output. Therefore, even when receiving the FAX data, the image processing device 2 sometimes detects a failure such as a paper jam in the sheet conveyance path, toner empty, or a sheet empty.

Figure 4:
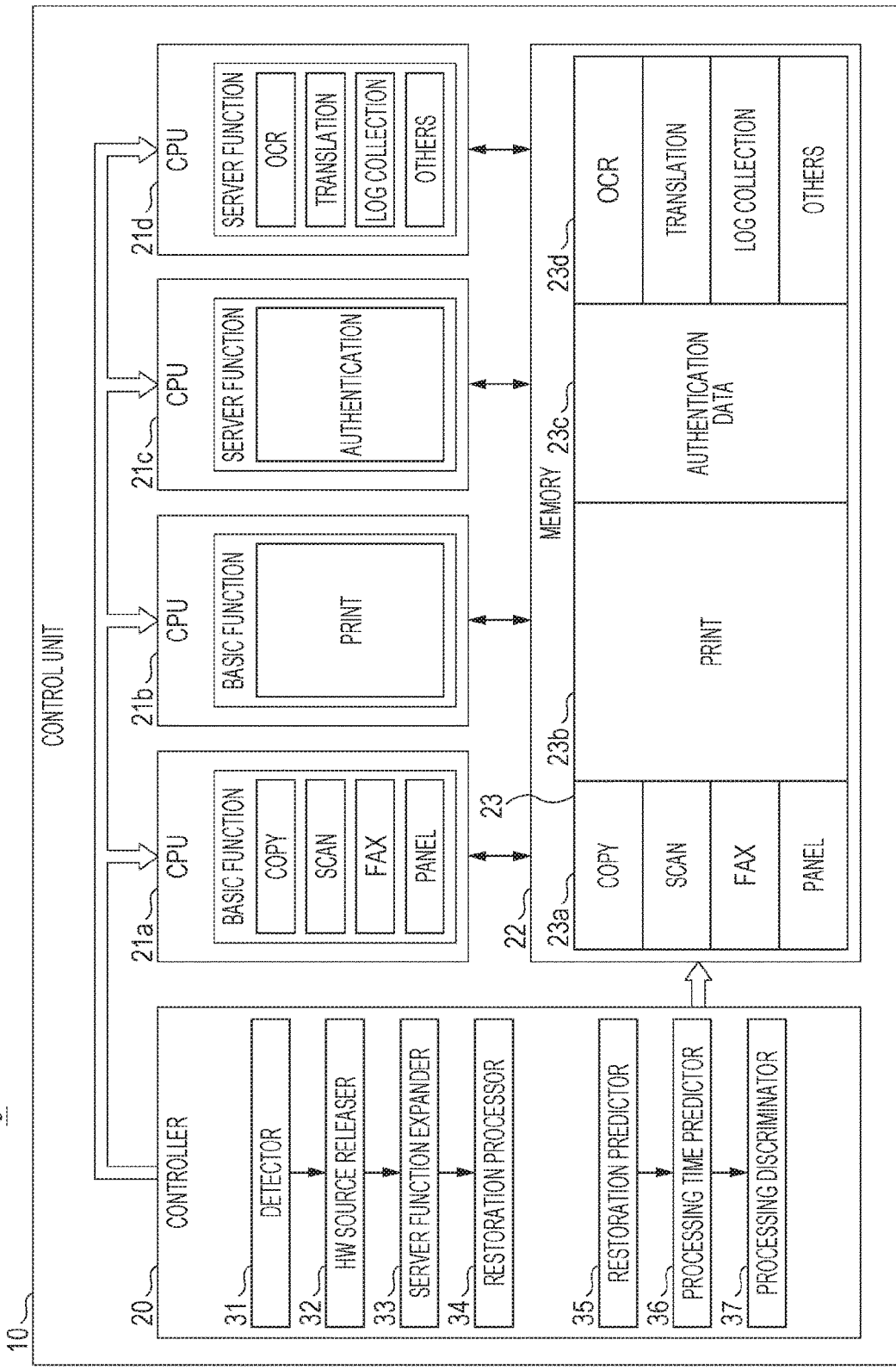
FIG. 4 is a diagram illustrating a configuration example of a control unit of a server device.

Next, a configuration example of the control unit 10 in the image processing devices 2a, 2b, and 2c that function as the server devices 3 will be described. FIG. 4 is a diagram illustrating a configuration example of the control unit 10 of the server device 3. As illustrated in FIG. 4, the control unit 10 of the server device 3 includes a controller 20, a plurality of CPUs 21a, 21b, 21c, and 21d, and a memory 22. The controller 20 is used to control hardware resources including the CPUs 21a, 21b, 21c, and 21d and the memory 22. For example, the controller 20 includes a CPU different from the CPUs 21a, 21b, 21c, and 21d and a memory different from the memory 22, and executes a part of the above-described program 7 (a program for controlling the hardware resources) to control assigned states of the basic functions and the server functions in the CPUs 21a, 21b, 21c, and 21d and the memory 22. However, the embodiment is not limited to the example. For example, the controller 20 may be operated in a part of the CPUs 21a, 21b, 21c, and 21d and the memory 22. Note that the plurality of CPUs 21a, 21b, 21c, and 21d is, for example, CPUs having the same performance.

The controller 20 respectively assigns the basic functions and the server functions to the plurality of CPUs 21a, 21b, 21c, and 21d at predetermined specified proportions in advance in a normal operation state where no failure has occurred and no transition to the power saving mode has been made in the server device 3. Further, the controller 20 assigns the basic functions and the server functions to a storage area 23 of the memory 22 at predetermined specified proportions in advance in the normal operation state where no failure has occurred and no transition to the power saving mode has been made in the server device 3. FIG. 4 illustrates an example of the state where the basic functions and the server functions are assigned to the plurality of CPUs 21a, 21b, 21c, and 21d and the memory 22 in the normal operation state.

As illustrated in FIG. 4, the basic functions are assigned to the CPUs 21a and 21b in the normal operation state. More specifically, the CPU 21a is assigned with a copy function, the scan function, the FAX function, and a panel function for controlling the operation panel 12, of the basic functions. Further, the CPU 21b is assigned with the printing function, of the basic functions. When executing a print job, conversion of image data to be printed into image data for drawing or image processing according to print settings are necessary and a higher load is applied than other jobs. Therefore, the one CPU 21b is assigned to the print function. Further, in the normal operation state, the server functions are assigned to the CPUs 21c and 21d. For example, as illustrated in FIG. 4, the CPU 21c is assigned with the authentication function of the server functions, and the CPU 21d is assigned with the OCR function, the translation function, the log collection function, and other functions.

Further, the storage area 23 of the memory 22 is mainly divided into four storage areas 23a, 23b, 23c, and 23d, and stores various types of information for operating the basic functions and various types of information for operating the server functions. For example, information regarding the basic functions and the server functions are stored in the four storage areas 23a, 23b, 23c, and 23d, as illustrated in FIG. 4, in the normal operation state where no failure has occurred and no transition to the power saving mode has been made in the server device 3. That is, the storage area 23a is assigned with the copy function, the scan function, the FAX function, and the panel function of the basic functions, and stores information used when operating these functions. Further, the storage area 23b is assigned with the print function, of the basic functions, and stores information regarding print jobs and information for operating the printer. In contrast, the storage areas 23c and 23d are assigned with the server functions. More specifically, the storage area 23c is assigned with the authentication function, of the server functions, and stores information used in the authentication function. The storage area 23d is assigned with the OCR function, the translation function, the log collection function, and other functions, of the server functions, and stores information used in the functions.

For example, the server device 3 reads the authentication data 8 from the storage 11 and expands at least a part of the authentication data 8 in advance in the storage area 23c of the memory 22 in the normal operation state. Therefore, when receiving the authentication request from the client device 4, the server device 3 can perform the user authentication by reference to the authentication data 8 previously expanded in the storage area 23c. Note that the authentication data 8 that can be expanded in advance in the storage area 23c may be a part of the authentication data 8 stored in the storage 11. In such a case, while the processing efficiency is increased if the server device 3 can perform the user authentication by reference to the authentication data 8 expanded in advance in the storage area 23c, the processing efficiency is slightly decreased if the server device 3 cannot perform the user authentication by reference to the authentication data 8 expanded in advance in the storage area 23c and needs to refer to the authentication data 8 stored in the storage 11.

The controller 20 assigns the basic functions and the server functions to the hardware resources and operates the hardware resources as described above in the normal operation state. Then, in the case where the basic function becomes inoperable due to the occurrence of a failure such as a paper jam or the transition to the power saving mode in the server device 3, the controller 20 detects the inoperable basic function, releases the inoperable basic function, of the basic functions assigned to the hardware resources, and additionally assigns the server function to the released hardware resource. That is, the controller 20 additionally operates the server function in the hardware resource in a state where at least a partial of the basic functions is stopped in the server device 3, thereby to improve the processing efficiency of the server function.

As illustrated in FIG. 4, the controller 20 according to the present embodiment functions as a detector 31, a hardware resource releaser 32, a server function expander 33, a restoration processor 34, a restoration predictor 35, a processing time predictor 36, and a processing discriminator 37, as processing based on the program 7 is performed by a CPU. Details of the respective parts will be described below.

The detector 31 detects occurrence of a failure related to the basic functions or transition to the power saving mode. For example, when a failure such as a paper jam, toner empty, or sheet empty occurs in the printer 15, the sensor 18 notifies the control unit 10 of the occurrence of the failure. Further, when a failure such as a paper jam occurs in the scanner 16, the sensor 19 notifies the control unit 10 of the occurrence of the failure. Furthermore, when the server device 3 transitions the power mode to the power saving mode, the power manager 14 notifies the control unit 10 of the transition to the power saving mode. Therefore, the detector 31 can detect the occurrence of a failure or the transition to the power saving mode in the server device 3 on the basis of the notification from the sensor 18 or 19 or the power manager 14. The detector 31 can also detect a factor of the failure that has occurred in the server device 3 by discriminating the notification content from the sensor 18 or 19.

The hardware resource releaser 32 is a processor that operates when the occurrence of a failure or the transition to the power saving mode is detected by the detector 31, and releases the function that has become inoperable due to the occurrence of a failure or the transition to the power saving mode, of the basic functions assigned to the hardware resources such as the CPUs 21a, 21b, 21c, and 21d and the memory 22, from the hardware resource. For example, the hardware resource releaser 32 releases processing that has been performed in the CPU 21a or 21b for the function that has become inoperable due to the occurrence of a failure or the transition to the power saving mode to reduce a use rate of the CPU 21a or 21b. In addition, the hardware resource releaser 32 releases the storage area 23a or 23b of the memory 22, which has been secured for the function that has become inoperable due to the occurrence of a failure or the transition to the power saving mode, to make the storage area be a state where another information can be stored.

The server function expander 33 is a processor that additionally assigns the server function to the portion released by the hardware resource releaser 32, of the hardware resources such as the CPUs 21a, 21b, 21c, and 21d and the memory 22, and operates the server function. For example, after the processing having been performed in the CPU 21a or 21b is released by the hardware resource releaser 32, the server function expander 33 causes the CPU 21a or 21b to additionally execute processing based on the server function, thereby to make the occupancy of the processing by the server function high. Further, after the storage area 23a or 23b of the memory 22 is released by the hardware resource releaser 32, the server function expander 33 expands the information to be used in the server function to the storage area 23a or 23b in an empty state.

Figure 5A:
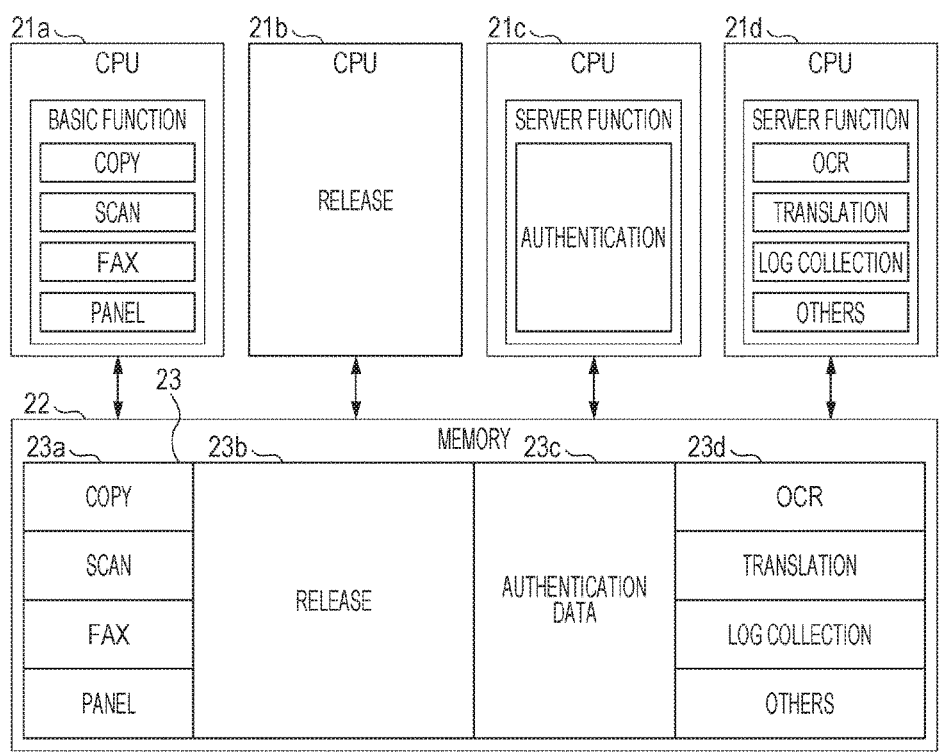
FIGS. 5A and 5B are diagrams illustrating an example of expansion of a server function in the case where a failure has occurred in a print function.
Figure 5B:
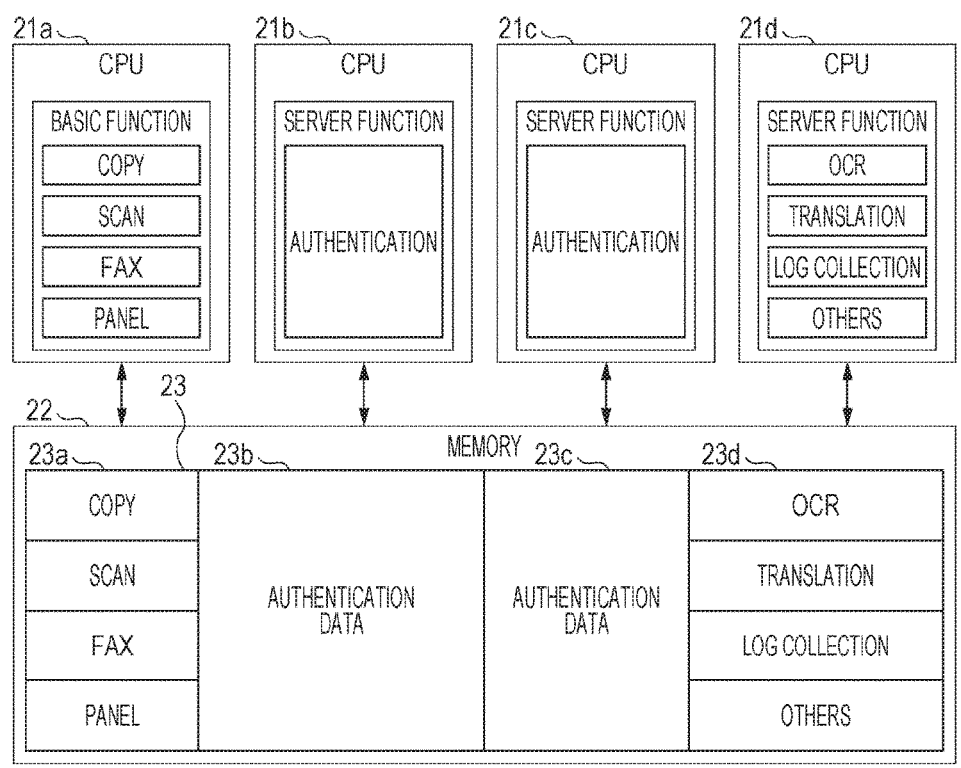

FIGS. 5A and 5B are diagrams illustrating an example of expansion of a server function in the case where a failure has occurred in the print function. When a failure such as a paper jam occurs in the print function, the hardware resource releaser 32 releases the processing related to the print function that has been performed by the CPU 21b, as illustrated in FIG. 5A. Further, the hardware resource releaser 32 releases the storage area 23b of the memory 22 in which the information to be used in the print function has been stored.

Thereafter, as illustrated in FIG. 5B, the server function expander 33 additionally assigns the server function to the released CPU 21b to cause the CPU 21b to execute processing related to the server function. FIG. 5B illustrates an example in which the CPU 21b executes the processing related to the authentication function, of the server functions.

Further, as illustrated in FIG. 5B, the server function expander 33 additionally assigns the server function to the released storage area 23b, and expands the information to be used in the server function to the storage area 23b. FIG. 5B illustrates an example in which the authentication data 8 to be used in the authentication function, of the server functions, is expanded to the storage area 23b.

In this way, when a failure has occurred in the print function, the controller 20 releases the hardware resource occupied by the print function and assigns a part of the server functions to the hardware resource to operate the server function, thereby to improve the processing efficiency of the expanded server function. For example, when the authentication function is expanded as illustrated in FIGS. 5A and 5B, an opportunity to obtain an authentication result by reference to the authentication data expanded in the storage area 23b and 23c of the memory 22 is increased, and an opportunity to refer to the authentication data 8 stored in the storage 11 can be decreased, when the user authentication is performed in the server device 3. Therefore, the processing efficiency in performing the user authentication in the server device 3 can be improved.

Figure 6A:
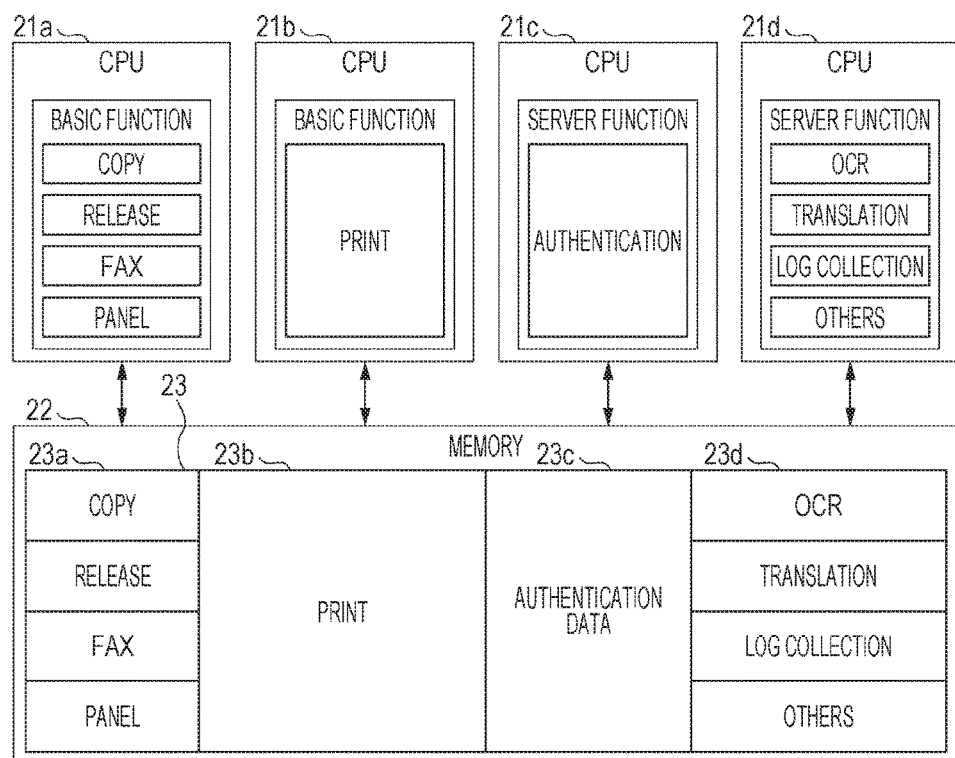
FIGS. 6A and 6B are diagrams illustrating an example of expansion of a server function in the case where a failure has occurred in a scan function.
Figure 6B:
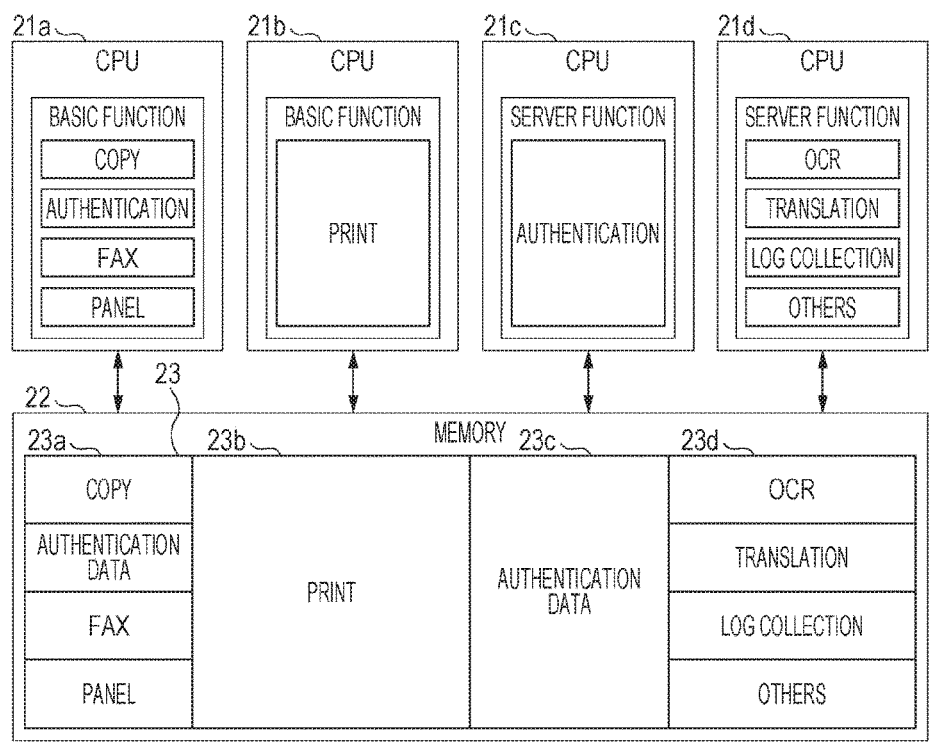

FIGS. 6A and 6B are diagrams illustrating an example of expansion of a server function in the case where a failure has occurred in the scan function. When a failure such as a paper jam occurs in the scan function, the hardware resource releaser 32 releases only the processing related to the scan function, of processing related to the basic functions that has been performed by the CPU 21a, as illustrated in FIG. 6A. Therefore, when the failure has occurred in the scan function, only a part of the CPU 21a is released. In addition, the hardware resource releaser 32 releases only a part of the storage area 23a of the memory 22, the part storing the information to be used in the scan function. Therefore, the volume of hardware resources released by the hardware resource releaser 32 is smaller when the failure has occurred in the scan function than when the failure has occurred in the print function.

Thereafter, as illustrated in FIG. 6B, the server function expander 33 additionally assigns the server function to the part of the CPU 21a released by the hardware resource releaser 32 to cause the CPU 21a to execute processing related to the server function. FIG. 6B illustrates an example in which the part of the CPU 21a executes the processing related to the authentication function, of the server functions.

Further, as illustrated in FIG. 6B, the server function expander 33 additionally assigns the server function to the released part of the storage area 23a, and expands the information to be used in the server function to the part of the storage area 23a. FIG. 6B illustrates an example in which the authentication data 8 to be used in the authentication function, of the server functions, is expanded to the storage area 23b.

In this way, when a failure has occurred in the scan function, the controller 20 releases the hardware resource occupied by the scan function and assigns a part of the server functions to the hardware resource to operate the server function, thereby to improve the processing efficiency of the expanded server function. Note that, even when the failure has occurred in the scan function and the authentication function has been expanded as illustrated in FIGS. 6A and 6B, the degree of expansion of the server function is smaller than when the failure has occurred in the print function. Therefore, when a failure has occurred in the scan function, it is difficult to improve the processing efficiency to the same extent as when a failure occurs in the print function.

Further, when the server function expander 33 has expanded the server function as described above, the server function expander 33 notifies other image processing devices 2 connected to the network 5 that the server function has been expanded. This notification is made not only to the client devices 4 but also to other server devices 3. With the notification, the client devices 4 can grasp that the processing efficiency of the server function has increased in the specific server device 3, of the plurality of server devices 3. Further, the other server device 3 can grasp that the processing efficiency of the server function has increased in the special server device 3.

The restoration processor 34 is a processor that functions when a failure or restoration from the power saving mode has been detected by the detector 31., and releases the server function from the hardware resource of the portion to which the server function has been additionally assigned by the server function expander 33 and assigns the basic function that has become operable due to the restoration from the failure or the power saving mode to the portion again to restore the portion to the original state. In the case where the server function has been expanded to the state as illustrated in FIG. 5B, for example, due to the occurrence of a failure or the transition to the power saving mode, the restoration processor 34 releases the authentication function from the CPU 21b and releases the authentication data from the storage area 23b of the memory 22. Thereafter, the restoration processor 34 causes the CPU 21b to operate the print function and stores the information to be used in the print function in the storage area 23b of the memory 22. As a result, the operation state in the control unit 10 is returned to the operation state illustrated in FIG. 4.

Further, when performing restoration processing, the restoration processor 34 notifies other image processing devices 2 connected to the network 5 that the basic function is to be restored. This notification is made not only to the client devices 4 but also to other server devices 3. With the notification, the other image processing devices 2 can grasp that the expanded state of the server function is to be terminated.

Figure 7:
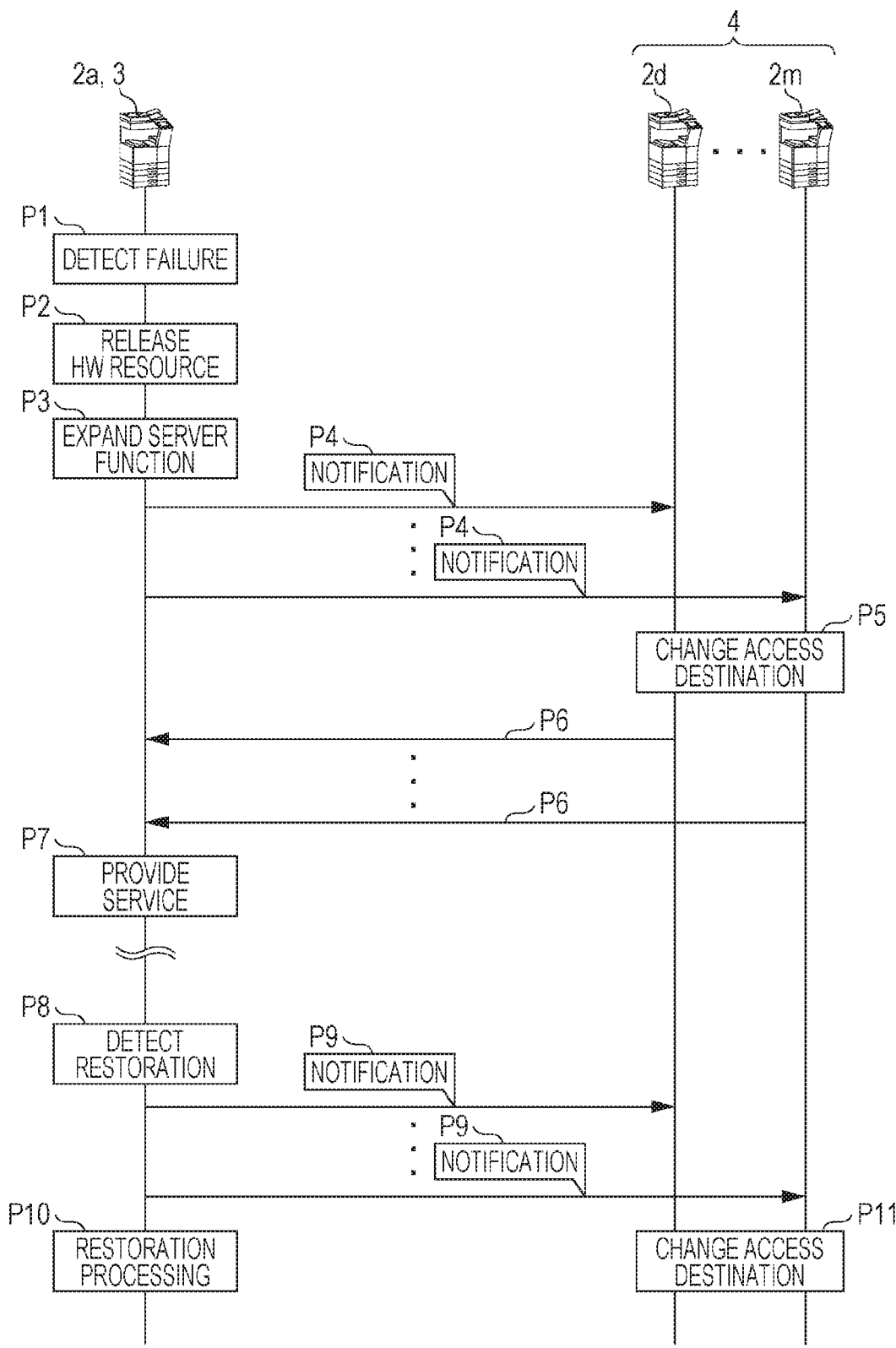
FIG. 7 is a diagram illustrating an example of an operation process in the case where a failure has occurred in a server device.

FIG. 7 is a diagram illustrating an example of an operation process in the case where a failure has occurred in the server device 3. Note that FIG. 7 illustrates a case in which a failure occurs in the image processing device 2a that is one of the server devices 3, as an example. When the image processing device 2a has detected the occurrence of a failure in the basic function (process P1), the image processing device 2a releases the hardware resource to which the basic function has been assigned (process P2), and additionally assigns the server function to the released hardware resource to expand the server function (process P3). The image processing device 2a notifies all the image processing devices 2d to 2m as the client devices 4 that the server function has been expanded, with the expansion of the server function (process P4). Each client device 4 grasps that the server function has been expanded in the image processing device 2a when receiving the notification from the image processing device 2a. Then, each client device 4 changes an access destination of when using the server function expanded in the image processing device 2a (process P5). For example, in the case where the authentication function has been expanded in the image processing device 2a, each client device 4 changes the server device 3 to access when performing user authentication, to the image processing device 2a. Thereafter, when using the server function expanded in the image processing device 2a, each client device 4 accesses the image processing device 2a (process P6).

When receiving a processing request for the server function from each client device 4, the image processing device 2a operates the server function on the basis of the processing request and provides the requested service (process P7). That is, since the operation of the basic function is in a restricted state, the image processing device 2a receives the processing request from each client device 4 on behalf of other server devices 3 and provides the service by the server function.

Figure 8:
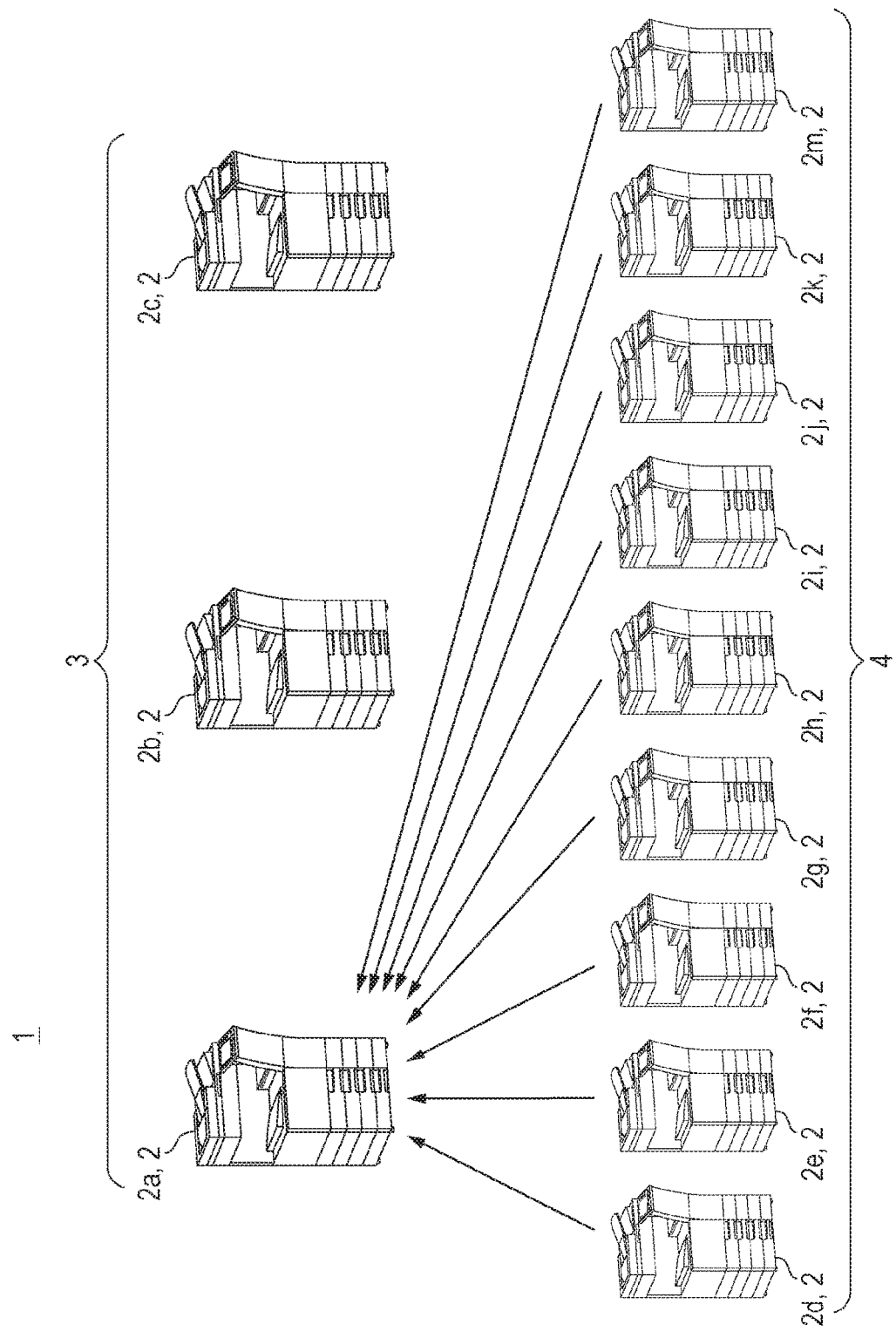
FIG. 8 is a diagram illustrating an example in which an image processing device provides a service by a server function on behalf of other server devices.

FIG. 8 is a diagram illustrating an example in which the image processing device 2a provides the service by the server function on behalf of other server devices 3. When the image processing device 2a notifies each client device 4 that the server function has been extended, each client device 4 accesses the image processing device 2a when using the server function after the notification, as illustrated in FIG. 8. That is, the image processing device 2a receives the processing requests from the client devices 2g to 2m, which the image processing device 2a does not receive in the normal operation state, and provides the service by the server function. At this time, the image processing device 2a has the expanded server function and has the raised processing efficiency, as compared with the other server devices 3, and thus can provide the service without stress even if the processing requests from the client devices 4 flock into the image processing device 2a.

Referring back to FIG. 7, when the image processing device 2a detects restoration from the failure or the power saving mode (process P5), the image processing device 2a notifies all the image processing devices 2d to 2m as the client devices 4 that the basic function is to be restored (process P9). With the notification, each client device 4 can grasp that the improved state of the processing efficiency of the server function is to be terminated in the image processing device 2a. Further, the image processing device 2a performs restoration processing of restoring the basic function (process P10) with the notification to the client devices 4. With the restoration processing, the basic function is restored to the original state in the image processing device 2a. Further, when receiving the notification from the image processing device 2a, each client device 4 changes the access destination again (process P11). With the change, the access destination that each client device 4 accesses to use the server function is changed to the predetermined access destination, as illustrated in FIG. 2.

Further, the controller 20 predicts a restoration time required to restore the basic function when the basic function becomes inoperable due to the occurrence of a failure or the transition to the power saving mode, and may receive the processing request from the client device 4, which the image processing device 2a does not receive in the normal operation state, on the condition that the processing of the expanded server function can be completed by the restoration time required. To perform such discrimination processing, the controller 20 includes the restoration predictor 35, the processing time predictor 36, and the processing discriminator 37.

The restoration predictor 35 is a processor that predicts the restoration time required for restoration from the failure or the power saving mode in the case where the occurrence of the failure related to the basic function or the transition to the power saving mode has been detected by the detector 31. The restoration predictor 35 identifies the factor why the basic function has become inoperable on the basis of a detection result of the detector 31, and predicts the restoration time required on the basis of the factor. More specifically, the restoration predictor 35 reads the prediction information 9 stored in the storage 11, and predicts the restoration time required on the basis of the prediction information 9.

FIG. 9 is a diagram illustrating an example of the prediction information 9. As illustrated in FIG. 9, the prediction information 9 is table information in which detection content detected by the detector 31 and the restoration time required defined according to the detection content are associated with each other. In the case where the detection content by the detector 31 is failure detection, the restoration time required is defined for each failure factor in the prediction information 9. Note that the restoration time required defined in the prediction information 9 is a time set in advance by an administrator of the server device 3, for example. When the occurrence of the failure related to the basic function or the transition to the power saving mode has been detected by the detector 31, the restoration predictor 35 can predict the restoration time required for restoration of the inoperable basic function by reference to the prediction information 9 on the basis of the detection result.

The processing time predictor 36 is a processor that predicts a processing time in the expanded server function in the case where one processing request is received from the client device 4 in the state where the server function is expanded. For example, in the case where the authentication function is additionally assigned and expanded in the server device 3, the processing time predictor 36 predicts the processing time required to obtain an authentication result when the user authentication is performed on the basis of one authentication request. Therefore, the processing time predicted by the processing time predictor 36 is shorter than a processing time required when the server device 3 has received the processing request from the client device 4 in the normal operation state.

The processing discriminator 37 functions when receiving the processing request for use of the extended server function from the client device 4 in the state where the server function is expanded. Then, the processing discriminator 37 compares the processing time predicted by the processing time predictor 36 and the restoration time required predicted by the restoration predictor 35. More specifically, the processing discriminator 37 compares the processing time required to complete the processing when the processing related to the expanded server function is started, and a remaining time of the restoration time required for restoration from the failure or the power saving mode at timing when receiving the processing request from the client device 4. Then, the processing discriminator 37 receives the processing request from the client device 4 and operates the server function on the condition that the processing time by the expanded server function is shorter than the remaining time of the restoration time required. In other words, the processing discriminator 37 does not receive the processing request from the client device 4 and transmits a notification to reject the processing request to the client device 4, when the processing time by the expanded server function is longer than the remaining time of the restoration time required.

That is, the processing discriminator 37 receives the request and operates the server function in the case where the processing based on the request from the client device 4 can be completed during a period in which the server function is expanded whereas the processing discriminator 37 does not receive the request in the case where the processing based on the request from the client device 4 cannot be completed during the period in which the server function is expanded. Thereby, the processing requests from a large number of client devices 4 can be prevented from staying and remaining when the server device 3 is restored from the failure. As a result, a load to the server function can be prevented from becoming extremely excessive after the restoration from the failure. In the case where the client device 4 receives the notification to reject the processing request from the server device 3, the client device 4 may just change the access destination and access a different server device 3.

Figure 10:
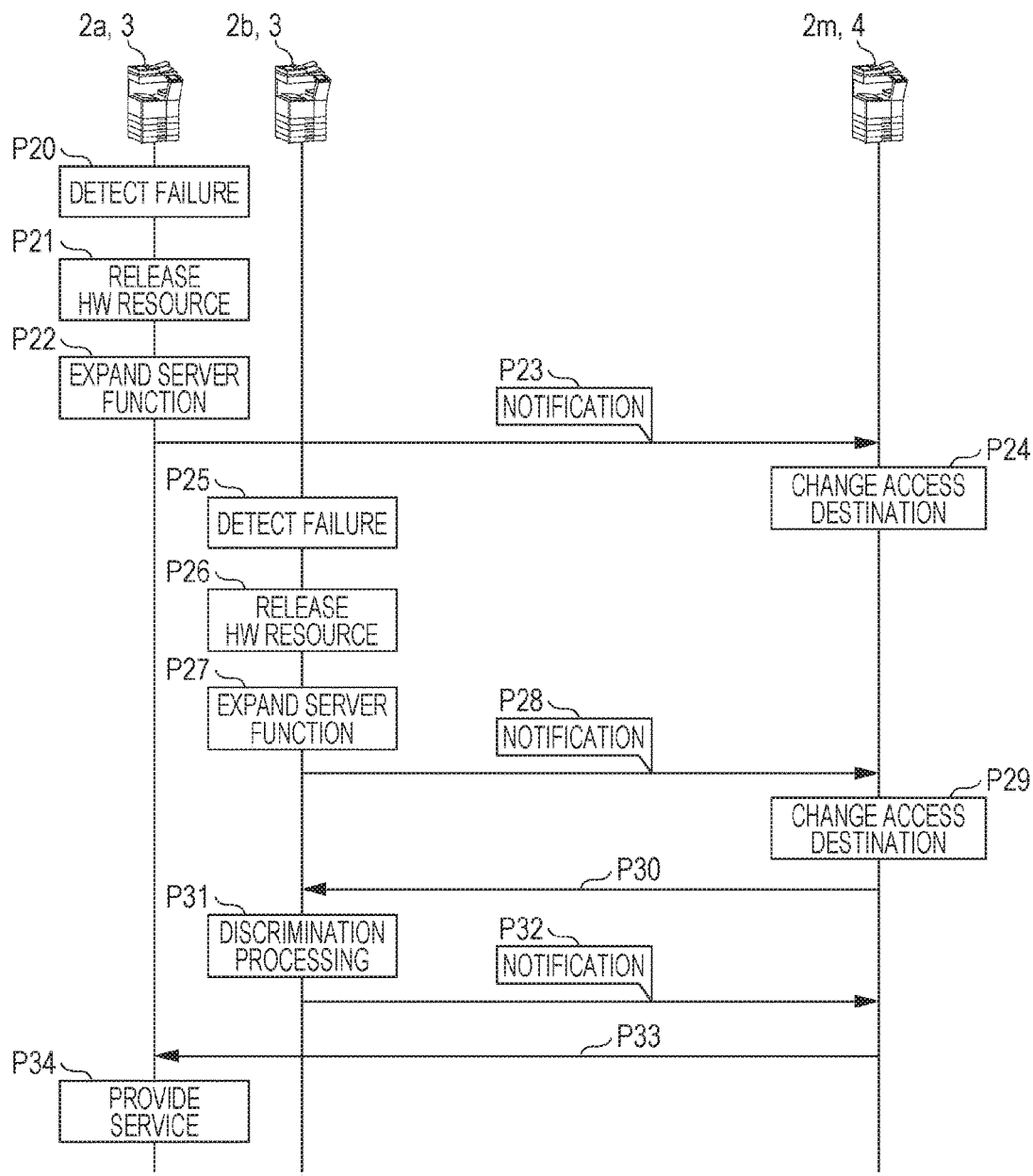
FIG. 10 is a diagram illustrating an example of an operation process in the case where a failure has occurred in a plurality of server devices.

FIG. 10 is a diagram illustrating an example of an operation process in the case where a failure has occurred in a plurality of server devices 3. Note that FIG. 10 illustrates a case in which failures sequentially occur in the image processing devices 2a and 2b that are the server devices 3, as an example. First, when the image processing device 2a has detected occurrence of the failure in the basic function (process P20), the image processing device 2a releases the hardware resource to which the basic function has been assigned (process P21), and additionally assigns the server function to the released hardware resource to expand the server function (process P22). At this time, in the case where the failure that has occurred in the image processing device 2a is toner empty, the image processing device 2a predicts that the restoration time required is 300 seconds and starts a counting operation of the restoration time required. Then, the image processing device 2a notifies all the image processing devices 2d to 2m as the client devices 4 that the server function has been expanded, with the expansion of the server function (process P23). Each client device 4 grasps that the server function has been expanded in the image processing device 2a when receiving the notification from the image processing device 2a. Then, each client device 4 changes the access destination of when using the server function expanded in the image processing device 2a (process P24).

Next, when the image processing device 2b has detected the occurrence of the failure in the basic function (process P25), the image processing device 2b releases the hardware resource to which the basic function has been assigned (process P26), and additionally assigns the server function to the released hardware resource to expand the server function (process P27). At this time, in the case where the failure that has occurred in the image processing device 2b is a paper jam in the scanner, the image processing device 2b predicts that the restoration time required is 20 seconds and starts a counting operation of the restoration time required. Then, the image processing device 2b notifies all the image processing devices 2d to 2m as the client devices 4 that the server function has been expanded, with the expansion of the server function (process P28). Each client device 4 grasps that the server function has been expanded in the image processing device 2b when receiving the notification from the image processing device 2b. Then, each client device 4 changes the access destination of when using the server function expanded in the image processing device 2b (process P29). For example, in the case where the same authentication function has been expanded in both the image processing devices 2a and 2b, each client device 4 changes the access destination of when using the authentication function to the image processing device 2*b* on the basis of the notification from the image processing device 2*b*.

Then, when using the authentication function expanded in the image processing devices 2*a* and 2*b*, each client device 4 accesses the image processing device 2*b* and transmits the authentication request to the image processing device 2*b* (process P30). When receiving the authentication request from the client device 4, the image processing device 2*b* discriminates whether the user authentication can be completed before the restoration from the failure (process P31). As a result, in the case where the image processing device 2*b* discriminates that the user authentication cannot be completed before the elapse of the restoration time required, the image processing device 2*b* transmits the notification to reject the authentication request to the client device 4 (process P32). When receiving the rejection notification from the image processing device 2*b*, the client device 4 changes the access destination to the image processing device 2*a*. That is, the client device 4 returns the state to the state before changing the access destination in process P29. Then, the client device 4 accesses the image processing device 2*b* and transmits the authentication request to the image processing device 2*b* (process P33).

When receiving the authentication request from the client device 4, the image processing device 2*a* discriminates whether the user authentication can be completed before the restoration from the failure, similarly to the image processing device 2*b*. Then, in the case where the image processing device 2*a* discriminates that the user authentication can be completed before the elapse of the restoration time required, the image processing device 2*a* performs the user authentication on the basis of the authentication request from the client device 4 and provides the service to the client device 4 (process P34).

FIG. 10 illustrates the case where the failure has occurred in the two image processing devices 2*a* and 2*b*, as an example. In contrast, in the case where the failure has occurred only in the image processing device 2*b*, the client device 4 accesses the access destination determined in advance in the client device 4 when receiving the rejection notification from the image processing device 2*b*.

Figure 11:
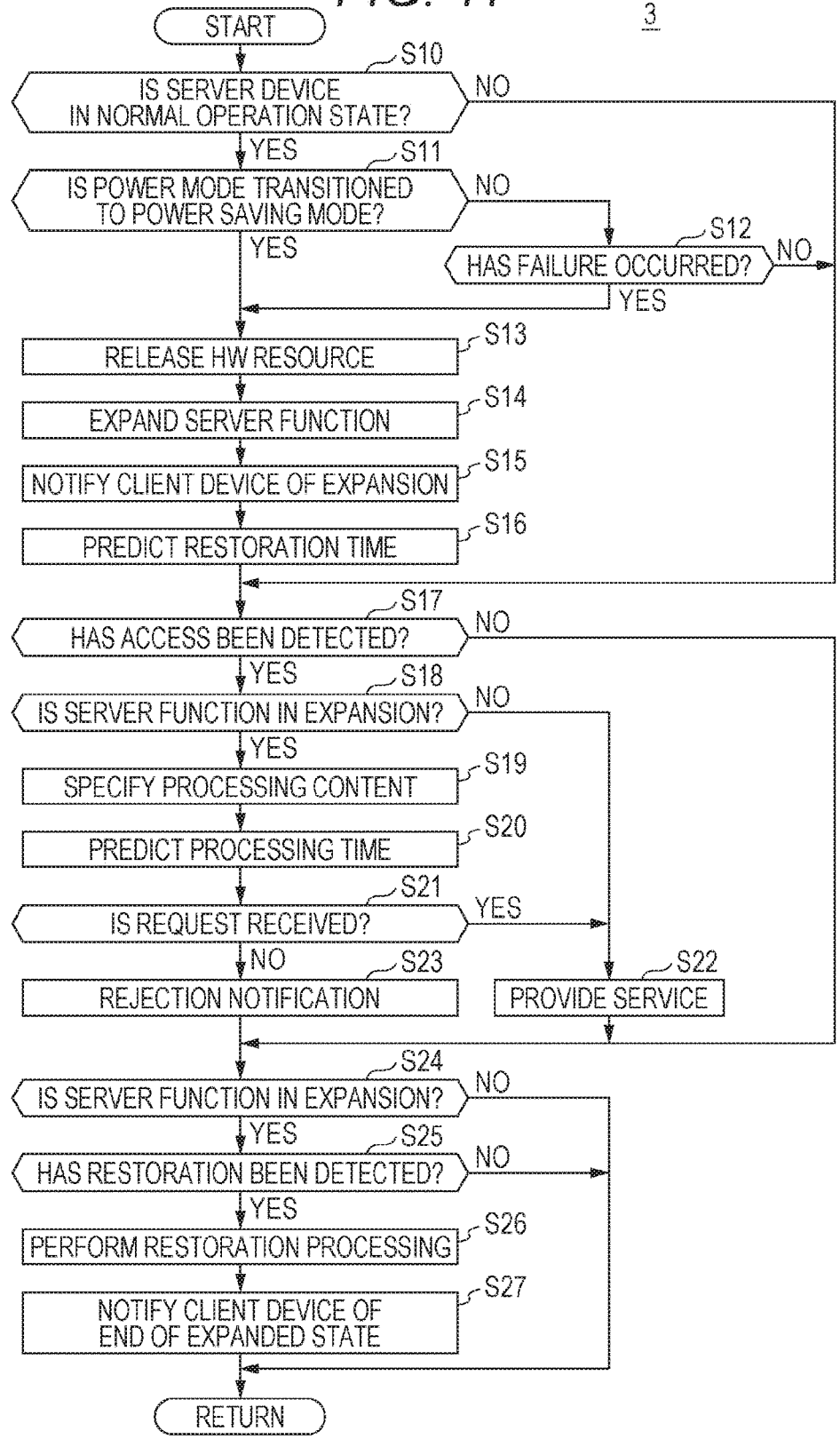
FIG. 11 is a flowchart illustrating an example of a processing procedure performed in a server device.

Next, a processing procedure performed in the server device 3 will be described. FIG. 11 is a flowchart illustrating an example of a processing procedure performed in the server device 3. This processing is performed as the CPU of the controller 20 executes the program 7. When starting the processing, the server device 3 determines whether the operation state is the normal operation state (step S10). As a result, in the case where the operation state is the normal operation state (YES in step S10), the server device 3 determines whether transitioning the power mode to the power saving mode (step S11). In the case of not transitioning the power mode to the power saving mode (NO in step S1), the server device 3 further determines whether a failure has occurred (step S12). In the case of transitioning the power mode to the power saving mode (YES in step S11) or in the case where the failure has occurred (YES in step S12), the server device 3 identifies the basic function that becomes inoperable due to the transition to the power saving mode or the occurrence of the failure, and releases the hardware resource to which the basic function has been assigned (step S13). Then, the server device 3 additionally assigns the server function to the released portion of the hardware resource to expand the server function (step S14). Then, the server device 3 notifies the client device 4 connected to the network 5 that the server function has been expanded (step S15). At this time, other server devices 3 are also notified that the server function has been expanded. Further, the server device 3 predicts the restoration time required on the basis of the factor why the basic function becomes inoperable (step S16). In the case where the operation state of the server device 3 is not the normal operation state (NO in step S10), or in the case where no failure has occurred in the server device 3 (NO in step S12), the server device 3 skips steps S13 to S16 described above.

Next, the server device 3 determines whether having detected the access from the client device 4 (step S17). In the case where the server device 3 has received the access from the client device 4 (YES in step S17), the server device 3 further determines whether the server function is in expansion (step S18). As a result, in the case where the server function is in expansion (YES in step S18), the server device 3 identifies the processing content by the server function on the basis of the processing request from the client device 4 (step S19). The server device 3 predicts the processing time on the basis of the identified processing content (step S20), and compares the processing time with the remaining time before the elapse of the restoration time required to determine whether receiving the processing request from the client device 4 (step S21). The server device 3 receives the processing request in the case where the server device 3 can complete the processing based on the processing request from the client device 4 before the elapse of the restoration time required (YES in step S21), and operates the server function and provides the service (step S22). On the other hand, the server device 3 does not receive the processing request in the case where the server device 3 cannot complete the processing based on the processing request from the client device 4 before the elapse of the restoration time required (NO in step S21), the server device 3 transmits the rejection notification to the client device 4 (step S23). In the case where the server device 3 has not detected the access from the client device 4 (NO in step S17), the server device 3 skips steps S18 to S23 described above. In the case where the server function is not being expanded when the server device 3 has detected the access (NO in step S18), the server device 3 receives the processing request from the client device 4 as usual, and operates the server function and provides the service (step S22).

Next, the server device 3 determines whether the server function is in expansion (step S24). In the case where the server function is in expansion (YES in step S24), the server device 3 further determines whether restoration from the power saving mode or the failure has been detected (step S25). As a result, in the case where the restoration has been detected (YES in step S25), the server device 3 performs the restoration processing to return the assigned states of the basic function and the server function to the hardware resources to the original states (step S26). Then, the server device 3 notifies the client devices 4 that the expanded state of the server function has ended (step S27). At this time, the server device 3 notifies other server devices 3 that the expanded state of the server function has ended. In the case where the server function is not expanded (NO in step S24), or in the case where the restoration from the power saving mode or the failure has not been detected (NO in step S25), the server device 3 skips steps S26 and S27 described above.

The server device 3 can expand the server function and improve the processing efficiency by the server function when the transition to the power saving mode has been detected or when the occurrence of the failure has been detected by repeatedly executing the above processing. Then, the server function can continue the improved state of the processing efficiency of the server function until the restoration from the power saving mode or the failure is detected.

Figure 12:
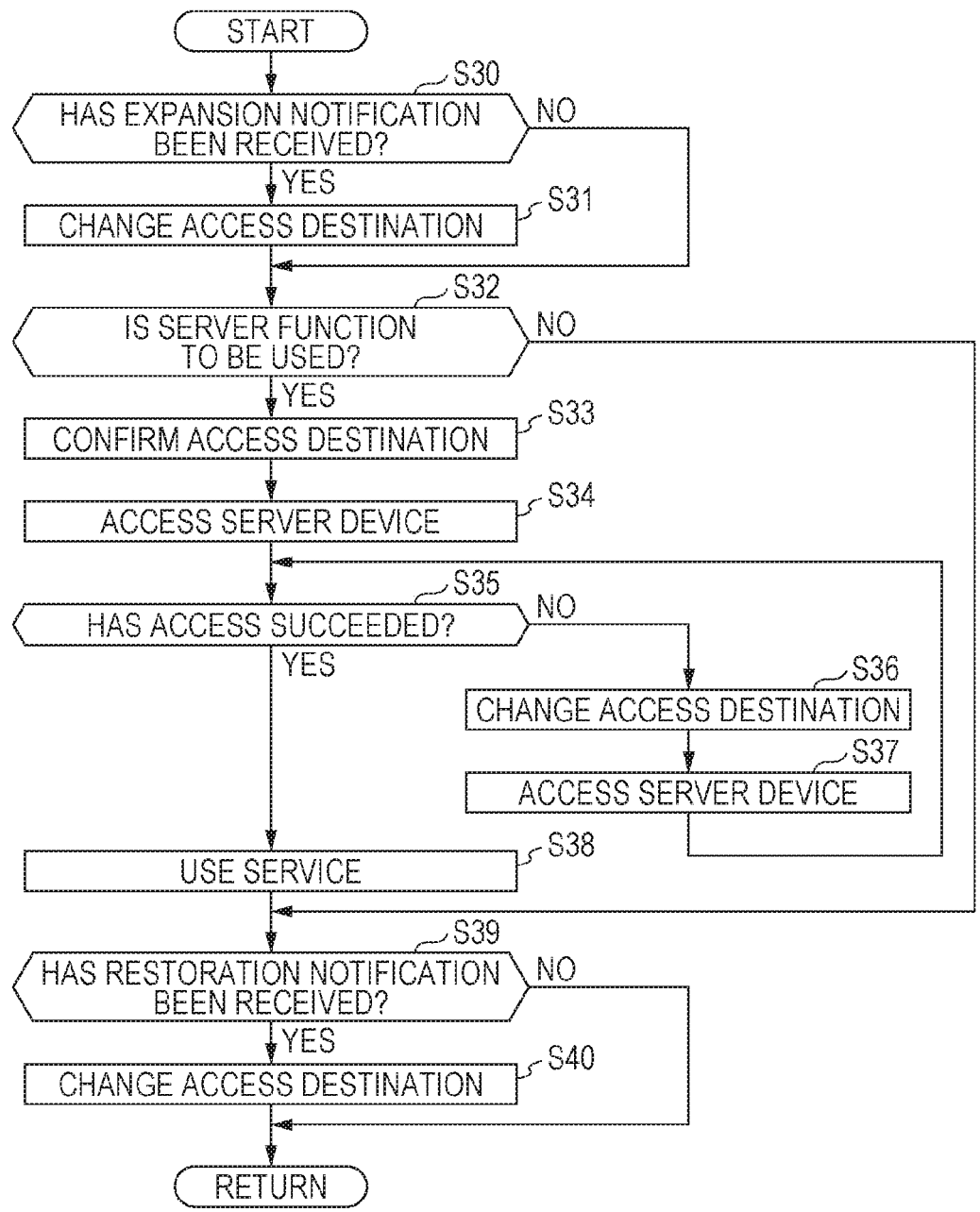
FIG. 12 is a flowchart illustrating an example of a processing procedure performed in a client device.

Next, a processing procedure performed in the client device 4 will be described. FIG. 12 is a flowchart illustrating an example of a processing procedure performed in the client device 4. This processing is performed as the CPU of the control unit 10 of the client device 4 executes the program 7. When starting the processing, the client device 4 determines whether having received the notification notifying that the function has been expanded in the server device 3 (step S30). In the case where the client device 4 has received the notification (step S30), the client device 4 changes the access destination of when using the expanded server function to the server device 3 that is the notification source (step S31). In the case where the client device 4 has not received the notification from the server device 3 (NO in step S30), the client device 4 does not change the access destination.

Next, the client device 4 determines whether using the server function (step S32). In the case of using the server function (YES in step S32), the client device 4 confirms the access destination according to which function of the server functions in the server device 3 is to be used (step S33), and accesses the server device 3 (step S34). At tins time, if there is the server device 3 with the expanded server function, the client device 4 preferentially accesses the server device 3 with the expanded server function. When having accessed the server device 3, the client device 4 determines whether the access has succeeded (step S35). That is, the client device 4 determines that the access has succeeded when not receiving the rejection notification from the server device 3 at access destination, and determines that the access has failed when receiving the rejection notification.

In the case where the access to the server device 3 has failed (NO in step S35), the client device 4 changes the access destination (step S36), and accesses the server device 3 at the changed access destination (step S37). After that, the processing by the client device 4 returns to step S35. On the other hand, in the case where the access to the server device 3 has succeeded (YES in step S35), the client device 4 uses the service provided by the server device 3 (step S38). In the case where it is not the timing to use the server function (NO in step S32), the client device 4 skips steps S33 to S38 described above.

Next, the client device 4 determines whether having received the restoration notification from the server device 3 (step S39), and in the case of having received the restoration notification (YES in step S39), the client device 4 changes the access destination again and returns the access destination to the original access destination (step S40).

The client device 4 changes the access destination of the server device 3 to a priority access destination when the server function is expanded in the server device 3 by repeatedly executing the above processing, thereby to efficiently use the server function.

Further, the restoration time required for the server device 3 to be restored from the failure or the power saving mode may be predicted by the client device 4. In this case, when notifying the client devices 4 of the server function, the server device 3 performs notification of the failure factor. Then each client device 4 predicts the restoration time required in the server device 3, similarly to the above description. After that, when using the server function, the client device 4 compares the restoration times required if the server function has been expanded in two or more server devices 3, and accesses the server device 3 with the longest restoration time required. As a result, the client device 4 can transmit a request to the server device 3 that continues the expanded state of the server function for the longest period of time, thereby to efficiently use the service.

Second Embodiment

Next, a second embodiment of the present invention will be described. In the present embodiment, an embodiment in which one of a plurality of server devices 3 serves as a representative device and distributes processing requests from client devices 4 to the plurality of server devices 3 will be described.

Figure 13:
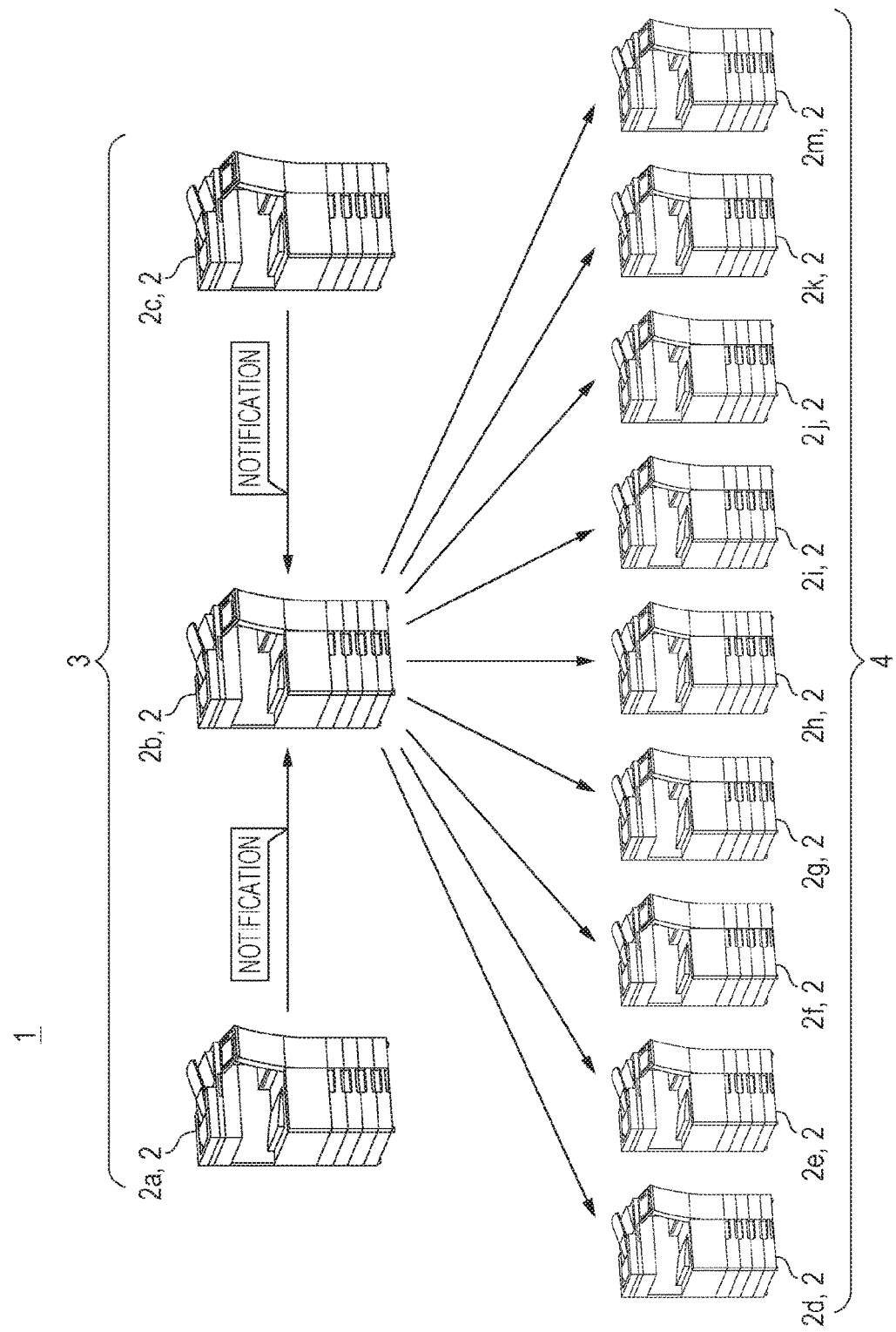
FIG. 13 is a diagram illustrating a configuration concept of an image processing system according to a second embodiment.

FIG. 13 is a diagram illustrating a configuration concept of an image processing system 1 according to the second embodiment. FIG. 13 illustrates a case where an image processing device 2*b* is operated as a representative device of the server devices 3, as an example. As illustrated in FIG. 13, when a failure or the like has occurred in the image processing devices 2*a* and 2*b* as the server devices 3 and a server function has been expanded, the image processing devices 2*a* and 2*b* notify the image processing device 2*b* as the representative device that the server function has been expanded. That is, notifications notifying that the server function has been expanded in other server devices 3 are put into the image processing device 2*b* as the representative device. Then, the image processing device 2*b* as the representative device grasps the expanded function in other server devices 3, and notifies client devices 4 of an access destination of when using the server function. That is, each server device 3 performs notification to each client device 4 via the representative device.

The image processing device 2*b* may notify each client device 4 of the access destination at timing when the server function has been expanded in any of the plurality of server devices 3 or may performs notification of the access destination at timing when receiving a processing request from each client device 4. In the present embodiment, the latter case will be described as an example.

Figure 14:
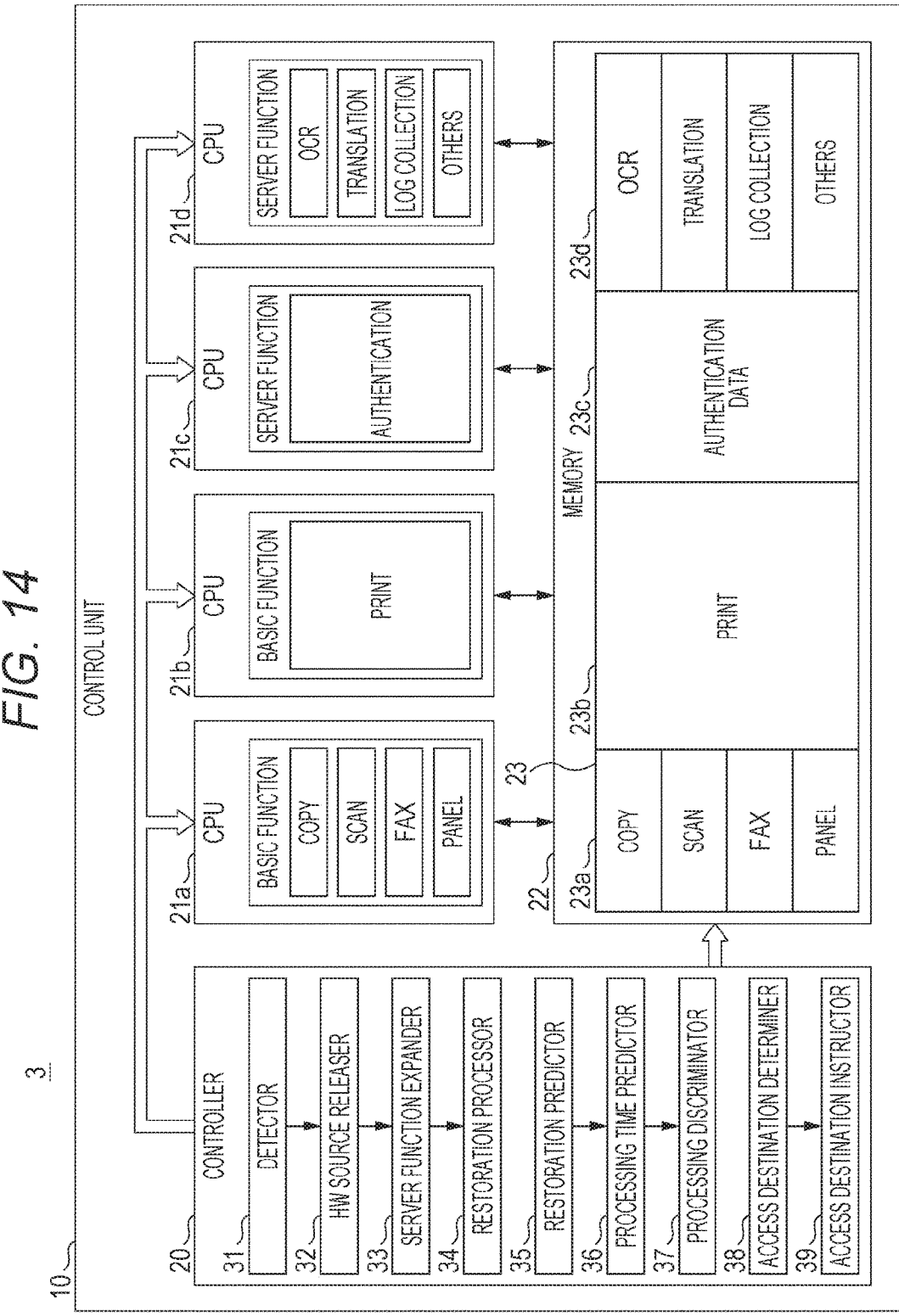
FIG. 14 is a diagram illustrating a configuration example of a control unit in the second embodiment.

Next, a configuration example of a control unit 10 in the image processing devices 2*b* (server device 3) that function as the representative device will be described. FIG. 14 is a diagram illustrating a configuration example of the control unit 10 of the image processing devices 2*a*. As illustrated in FIG. 14, the control unit 10 of the image processing device 2*b* includes a controller 20, a plurality of CPUs 21*a*, 21*b*, 21*c*, and 21*d*, and a memory 22, similarly to the first embodiment. Then, the controller 20 assigns basic functions and server functions to the plurality of CPUs 21*a*, 21*b*, 21*c*, and 21*d* and the memory 22 in a normal operation state, similarly to the first embodiment.

The controller 20 of the present embodiment functions as an access destination determiner 38 and an access destination instructor 39 in addition to the configuration described in the first embodiment, as illustrated in FIG. 14, as processing based on a program 7 is performed by a CPU. Hereinafter, the access destination determiner 38 and the access destination instructor 39 will be described in detail.

The access destination determiner 38 analyzes a factor why the server function has been expanded with reception of an expansion notification notifying that the server function has been expanded from other server devices 3, and determines the priority of the server devices 3 as transmission sources of the expansion notification. Further, when the access destination determiner 38 has determined the priority of the server devices 3 as the transmission sources of the expansion notification, the access destination determiner 38 determines a priority access destination that each client device 4 preferentially accesses, from among the plurality of server devices 3 on the basis of the priority. Specifically, the access destination determiner 38 determines the priority of the server devices 3 as the transmission sources by reference to access destination discrimination information 41 illustrated in FIG. 15, for example, and determines the priority access destination of the client device 4. That is, as illustrated in FIG. 15, the access destination discrimination information 41 is table information in which the factor why the server function has been expanded and the priority are associated with each other. Therefore, the access destination determiner 38 can determine the priority of the server devices 3 as the transmission sources of the expansion notification by reference to the access destination discrimination information 41 by specifying the factor why the server function has been expanded. Then, the access destination determiner 38 determines the server device 3 with the highest priority, of the plurality of server devices 3, as the priority access destination. Note that the access destination discrimination information 41 is correlated with the above-described prediction information 9, and is set in advance such that the priority becomes higher as a restoration time required for restoration from a power saving mode or a failure becomes longer. Further, the access destination discrimination information 41 is stored in advance in a storage 11, for example.

Further, the access destination determiner 38 also functions in the case where the server function of the server device has been expanded, and analyzes the factor why the server function of the server device has been expanded and determines the priority of the server device. Then, the access destination determiner 38 compares the priority of the server device and the priorities of other server devices 3, and determines one priority access destination.

By the way, in the case where the server function has not been expanded in each of the plurality of server devices 3, the priorities of the plurality of server devices 3 are equal. In such a case, the access destination determiner 38 determines the priority access destination such that the processing requests from the client devices 4 are distributed to the plurality of server devices 3.

The access destination instructor 39 operates in the case of receiving a processing request from the client device 4. Then, the access destination instructor 39 instructs the client device 4 on the priority access destination determined by the access destination determiner 38. In the case where the server device is the priority access destination, the access destination instructor 39 operates the server function of the server device on the basis of the processing request from the client device 4.

Figure 16:
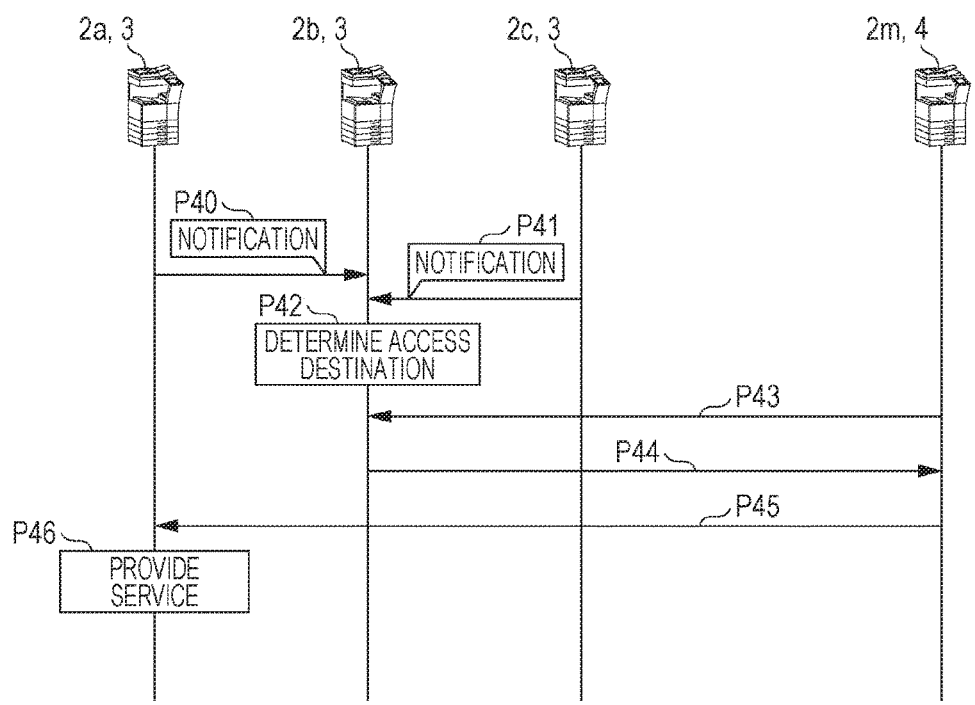
FIG. 16 is a diagram illustrating an example of an operation process in the image processing system of the second embodiment.

FIG. 16 is a diagram illustrating an example of an operation process in the image processing system 1 of the present embodiment. Note that FIG. 16 illustrates a case in which failures sequentially occur in the image processing devices 2a and 2c that are the server devices 3, as an example. First when the image processing device 2a has detected occurrence of the failure in a basic function, the image processing device 2a releases a hardware resource to which the basic function has been assigned, and additionally assigns a server function to the released hardware resource to expand the server function. With the expansion, the image processing device 2a transmits a notification notifying that the server function has been expanded to the image processing device 3b as the representative device (process P40). Then, when the failure has occurred in the basic function in the image processing device 2b, the image processing device 2b expands the server function and transmits the notification notifying that the server function has been expanded to the image processing device 3b as the representative device, similarly to the above description (process P41).

When receiving the notifications notifying that the server function has been expanded from the image processing devices 2a and 2b, the image processing device 2b as the representative device determines the priorities of the image processing devices 2a and 2b, and determines the priority access destination to be preferentially accessed by the client device 4 (process P42). For example, in the case where the image processing device 2a in which the server function has been expanded prior to the image processing device 2b in which the server function has been expanded continues the expanded state of the server function for a longer period of time, the image processing device 2b determines the image processing device 2a as the priority access destination.

Meanwhile, the image processing device 2m as the client device 4 first accesses the image processing device 2b as the representative device when using the server function (process P43). When detecting the access from the image processing device 2m, the image processing device 2b confirms the priority access destination. Then, in the case where the image processing device 2b is not the priority access destination, the image processing device 2b notifies the image processing device 2m of the priority access destination (process P44). For example, in the case where the priority access destination is the image processing device 2a, the image processing device 2b notifies the image processing device 2m that the image processing device 2m should access the image processing device 2a. The image processing device 2m accesses the image processing device 2a on the basis of the notification from the image processing device 2b as the representative device (process P45). Then, the image processing device 2a operates the server function and provides a service on the basis of a processing request from the image processing device 2m (process P46).

Figure 17:
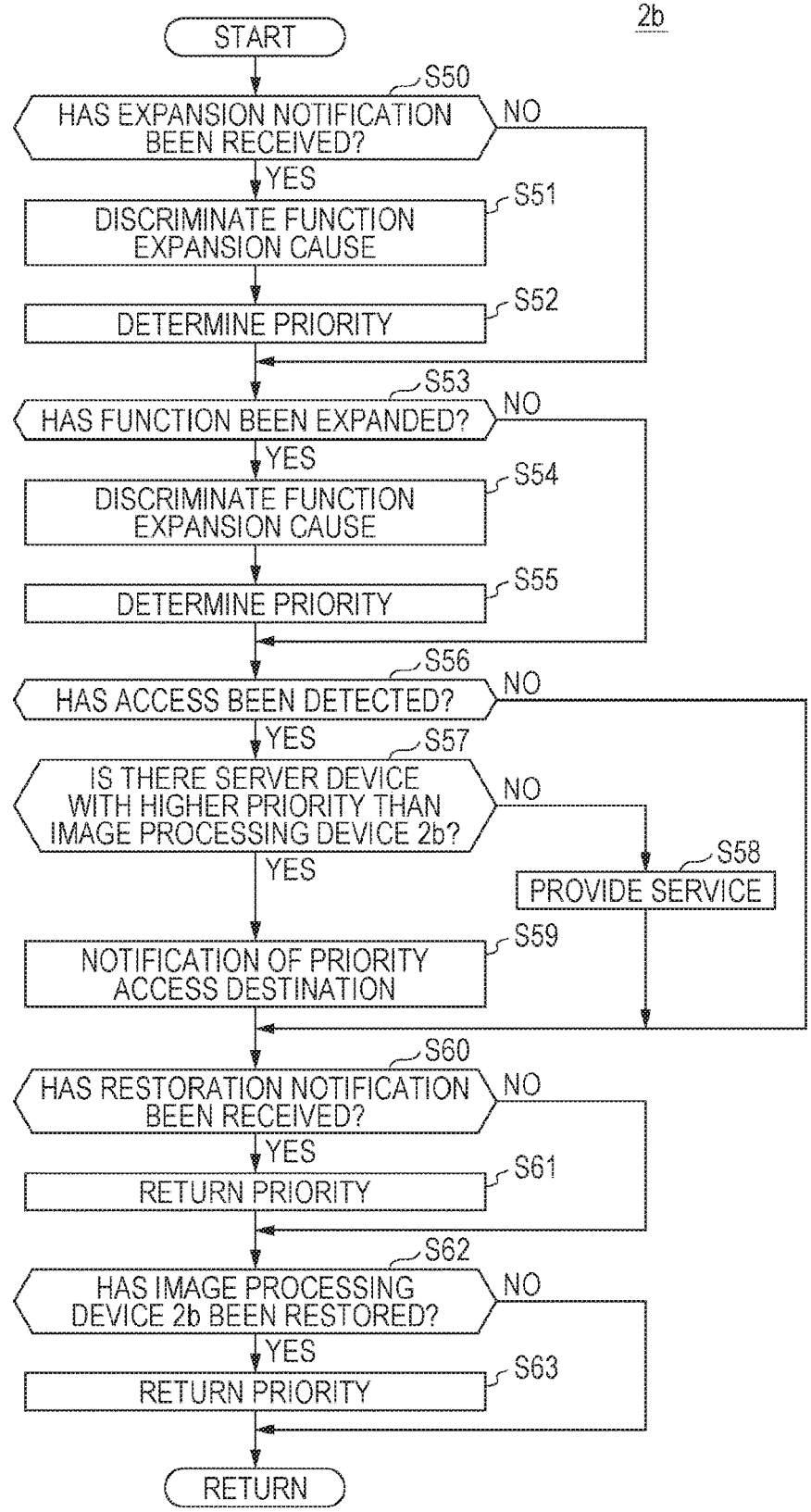
FIG. 17 is a flowchart illustrating an example of a processing procedure performed in an image processing device as a representative device.

FIG. 17 is a flowchart illustrating an example of a processing procedure performed in the image processing device 2b as the representative device. The image processing device 2b determines whether having received the expansion notifications notifying that the server function has been expanded from other server devices 3 (step S50). In the case of having received the expansion notifications (YES in step S50), the image processing device 2b discriminates a function expansion factor (step S51), and determines the priorities of the server devices 3 as the transmission sources of the expansion notifications (step S52). In the case of having not received the expansion notifications from other server devices 3 (NO in step S50), the image processing device 2b skips the processing of steps S51 and S52.

Next, the image processing device 2b determines whether the server function of the image processing device 2b has been expanded (step S53). In the case where the server function of the image processing device 2b has been expanded (YES in step S53), the image processing device 2b discriminates the function expansion factor (step S54), and determines the priority of the image processing device 2b (step S55). In the case where the server function of the image processing device 2b has not been expanded (NO in step S53), the image processing device 2b skips the processing of steps S54 and S55.

Next, the image processing device 2b determines whether having detected the access from the client device 4 (step S56). In the case of having detected the access (YES in step S56), the image processing device 2b compares the priorities of the server devices 3 and discriminates whether there is a server device 3 with a higher priority than the image processing device 2b (step S57). As a result, in the case where there is no server device 3 with a higher priority than the image processing device 2b (NO in step S57), the image processing device 2b operates the server function on the basis of the processing request from the client device 4 and provides the service (step S58). On the other hand, in the case where the server device 3 with a higher priority than the image processing device 2b is determined as the priority access destination (YES in step S57), the image processing device 2b notifies the client device 4 as the access source of the priority access destination (step S59). With the notification, the client device 4 accesses the priority access destination and uses the server function. In the case of having not detected the access from the client device 4 (NO in step S56), the image processing device 2b skips steps S57 to S59 described above.

Next, the image processing device 2b determines whether having received the restoration notification notifying that the basic function is restored from another server device 3 (step S60). When having received the restoration notification (YES in step S60), the image processing device 2b changes and returns the priority of the server device 3 as the transmission source of the restoration notification (step S61). In the case of having not received the restoration notification (NO in step S60), the processing of step S61 is not performed.

Next, the image processing device 2b determines whether the basic function of the image processing device 2b has been restored (step S62). When the basic function of the image processing device 2b has been restored (YES in step S62), the image processing device 2b changes and returns the priority of the image processing device 2b (step S63). In the case where the basic function of the image processing device 2b has not been restored (NO in step S62), the processing of step S63 is not performed.

The image processing device 2b can make the priority of the server device 3 high when the server function of any of the server devices 3 is expanded, and can set the server device 3 to the priority access destination of when each client device 4 use the server function, by repeatedly executing the above processing. Then, the client device 4 accesses the image processing device 2b as the representative device in using the server function, notification of the priority access destination is performed. Therefore, the client device 4 can access the server device 3 in which the client device 4 can most efficiently use the service. Further, when the basic function is restored in the server device 3 with the expanded server function, the image processing device 2b returns the priority of the server device 3 to the original state. Therefore, flocking of the processing requests from the client devices 4 into the server device 3 with a restored basic function can be suppressed.

Note that matters other than the points described in the present embodiment are similar to those described in the first embodiment.

Third Embodiment

Next, a third embodiment of the present invention will be described. In the present embodiment, a case in which a plurality of server devices 3 expands different functions from one another in the case of sequentially expanding server functions will be described.

Figure 18:
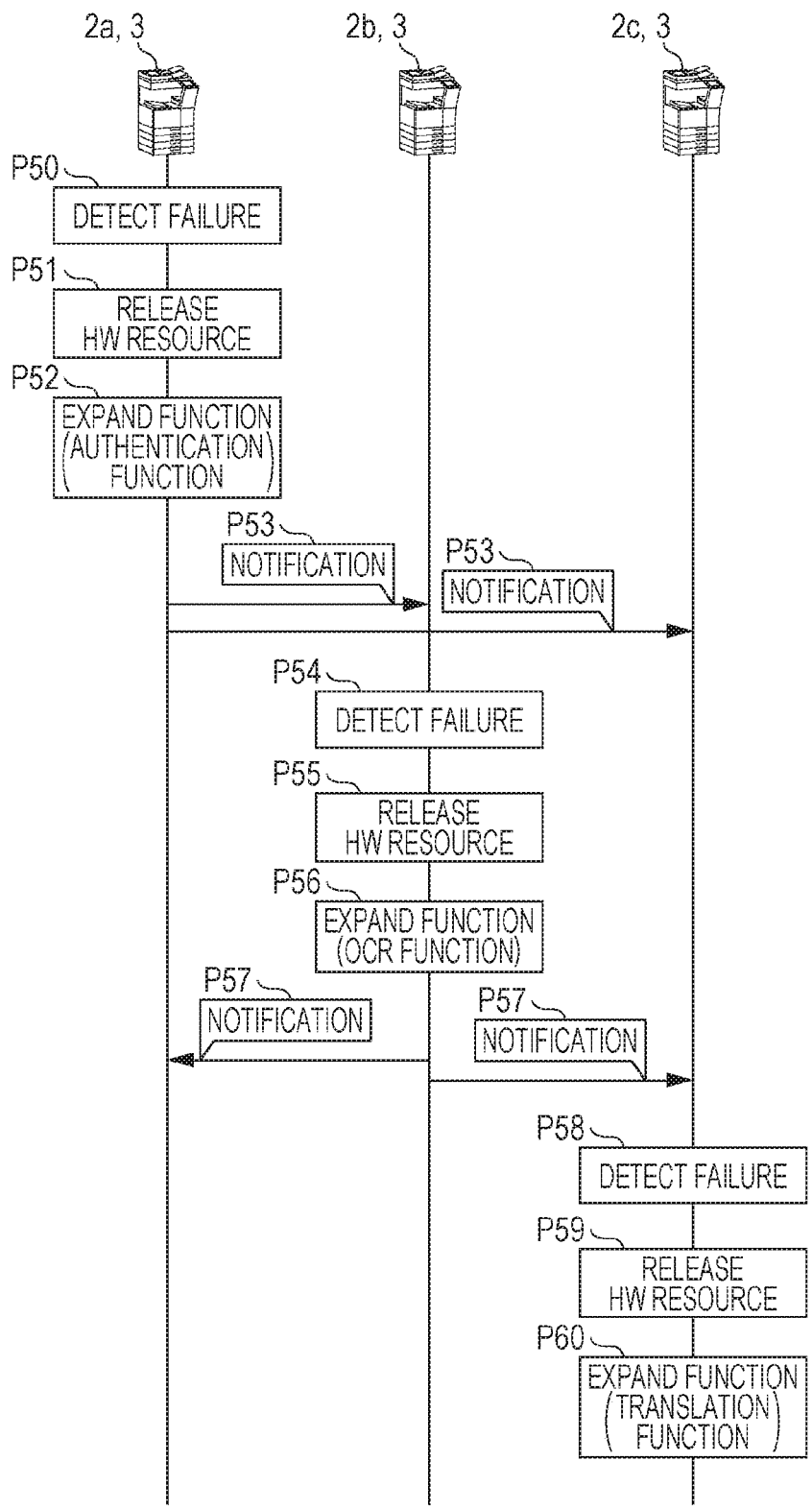
FIG. 18 is a diagram illustrating an example of an operation process in an image processing system of a third embodiment.

FIG. 18 is a diagram illustrating an example of an operation process in an image processing system 1 of the present embodiment. FIG. 18 illustrates an example in which server functions are expanded in the order of image processing devices 2a, 2b, and 2c that are server devices 3. First, when having detected a failure related to a basic function (process P50), an image processing device 2a releases a hardware resource to which the basic function has been assigned (process P51), and additionally assigns a server function to the hardware resource in an empty state (process P52). At this time, the image processing device 2a additionally assigns a default server function (for example, an authentication function) to the hardware resource to enable efficient authentication processing. When having expanded the authentication function, the image processing device 2a notifies the other image processing devices 2b and 2c that the authentication function has been expanded (process P53). With the notification, the other image processing devices 2b and 2c can grasp that the authentication function has been expanded in the image processing device 2a. Further, the notification in process P53 is transmitted not only to the server devices 3 but also to client devices 4. Therefore, each client device 4 can grasp that the authentication function has been expanded in the image processing device 2a.

First, when having detected a failure related to a basic function (process P54), the image processing device 2b releases a hardware resource to which the basic function has been assigned (process P55), and additionally assigns a server function to the hardware resource in an empty state (process P56). At this time, the image processing device 2b expands a function different from the authentication function expanded in the image processing device 2a. FIG. 18 illustrates a case in which an OCR function is expanded in the image processing device 2b. Therefore, the image processing device 2b becomes able to efficiently perform OCR processing corresponding to the OCR function. When having expanded the OCR function, the image processing device 2b notifies the other image processing devices 2a and 2c that the OCR function has been expanded (process P57). With the notification, the other image processing devices 2a and 2c can grasp that the OCR function has been expanded in the image processing device 2b. Further, the notification in process P57 is transmitted not only to the server devices 3 but also to client devices 4. Therefore, each client device 4 can grasp that the OCR function has been expanded in the image processing device 2b.

Thereafter, when having detected a failure related to a basic function (process P58), the image processing device 2c releases a hardware resource to which the basic function has been assigned (process P59), and additionally assigns a server function to the hardware resource in an empty state (process P60). At this time, the image processing device 2c expands a function different from the authentication function expanded in the image processing device 2a and the OCR function expanded in the image processing device 2b. FIG. 18 illustrates a case in which a translation function is expanded in the image processing device 2c. Therefore, the image processing device 2c becomes able to efficiently perform translation processing corresponding to the translation function. When having expanded the translation function, the image processing device 2c notifies the client devices 4 that the translation function has been expanded.

Therefore, when each client device 4 uses the server device 3 afterward, each client device 4 can select and access one server device 3 in which the processing can be most efficiently performed according to which of the plurality of server functions is to be used. For example, when using the authentication function, the client device 4 may just access the image processing device 2a. When using the OCR function, the client device 4 may just access the image processing device 2b. Further, when using the translation function, the client device 4 may just access the image processing device 2c.

Figure 19:
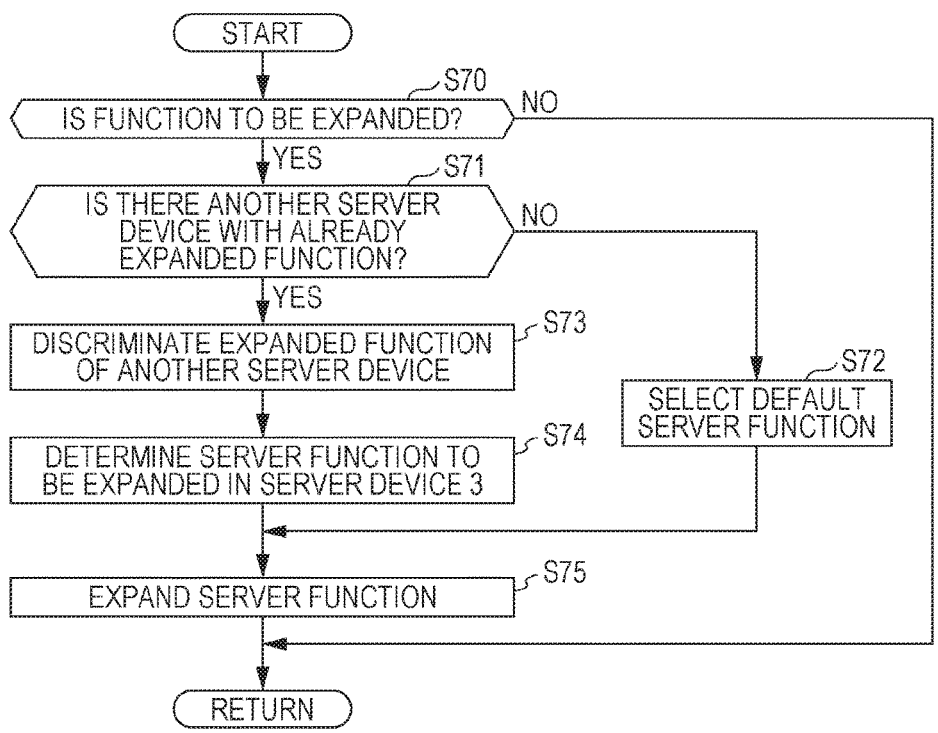
FIG. 19 is a flowchart illustrating an example of a processing procedure in a server device.

Next, a processing procedure performed in the server device 3 of the present embodiment will be described. FIG. 19 is a flowchart illustrating an example of a processing procedure in the server device 3. When starting the processing, the server device 3 determines whether expanding the server function (step S70). When expanding the server function due to occurrence of a failure in the basic function (YES in step S70), the server device 3 determines whether there is a server device 3 with an expanded server function other than server device 3 (step S71).

In the case where there is no server device 3 with an expanded server function other than the server device 3 (NO in step S71), the server device 3 selects a default predetermined server function as an expansion target (step S72). For example, when the authentication function is set as the default server function, the server device 3 selects the authentication function as an extension target.

On the other hand, in the case where another server device 3 with an expanded server function has already existed other than the server device 3 (YES in step S71), the server device 3 discriminates the expanded function in the other server device 3 (step S73), and determines the server function to be expanded in the server device 3 not to overlap with the server function in the other server device 3 (step S74). At this time, the server device 3 may select one function on the basis of a priority order.

Then, the server device 3 expands the function selected in step S72 or S74 (step S75). That is, the server device 3 releases the basic function and additionally assigns the function selected in step S72 or S74 to the hardware resource in the empty state to expand the server function. Thereafter, the server device 3 notifies the other server devices 3 and the client devices 4 that the server function has been expanded. In the case where no expansion of the server function is determined in step S70, the above processing of steps S71 to S75 is not performed.

The server device 3 can expand the function different from the function expanded in another server device 3 when expanding the server function by repeatedly executing the above processing. Therefore, when using the server function, the client device 4 can select the server device 3 that can most efficiently operate the server function to be used by the client device 4.

Note that matters other than the points described in the present embodiment are similar to those described in the first embodiment. Also in the present embodiment, one of the plurality of server devices 3 may serve as a representative device and notify the client device 4, as described in the second embodiment.

Fourth Embodiment

Next, a fourth embodiment of the present invention will be described. In the present embodiment, a log collection function that is one of server functions will be described in detail. The log collection function is a function in which each server device 3 collects log information from a predetermined client device 4. In the case where a plurality of server devices 3 is provided in an image processing system 1, the log collection function has a function in which one of the plurality of server devices 3 serves as a representative device and transmits log information collected from the server devices 3 to a cloud server.

Figure 20:
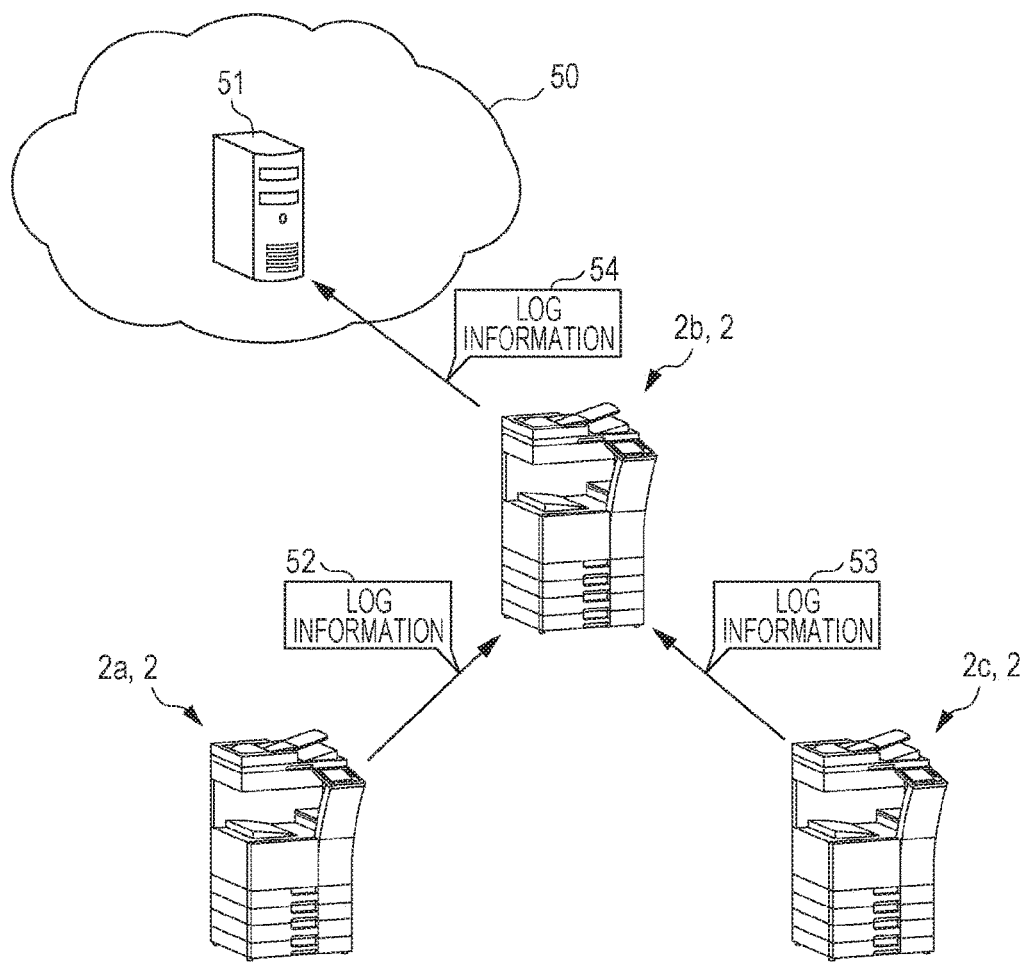
FIG. 20 is a diagram for describing an example of a server function related to a log collection function.

FIG. 20 is a diagram for describing an example of a server function related to the log collection function. FIG. 20 illustrates a case where an image processing device 2b is operated as a representative device, as an example. Image processing devices 2a, 2b, and 2c that are the server devices 3 collect log information from predetermined client devices 4. Then, the image processing device 2b as the representative device acquires log information 52 from the image processing device 2a and acquires log information 53 from the image processing device 2c at predetermined timing. Thereafter, the image processing device 2b generates log information 54 that is bound log information 52 and 53 and log information collected by the image processing device 2b, and transmits the log information 54 to a cloud server 51.

In such a situation, when a failure occurs in a basic function in the image processing device 2a and a server function related to the log collection function is expanded, the image processing device 2a is operated as the representative device on behalf of the image processing device 2b. That is, in the image processing device 2a, when occurrence of a failure or transition to a power saving mode has been detected by a detector 31, and a hardware resource is released by a hardware resource releaser 32, a server function expander 33 described above assigns the function as the representative device, that is, the function to collect the log information from the other image processing devices 2b and 2c and transmit the log information to the cloud server 51 to the released hardware resource.

Figure 21:
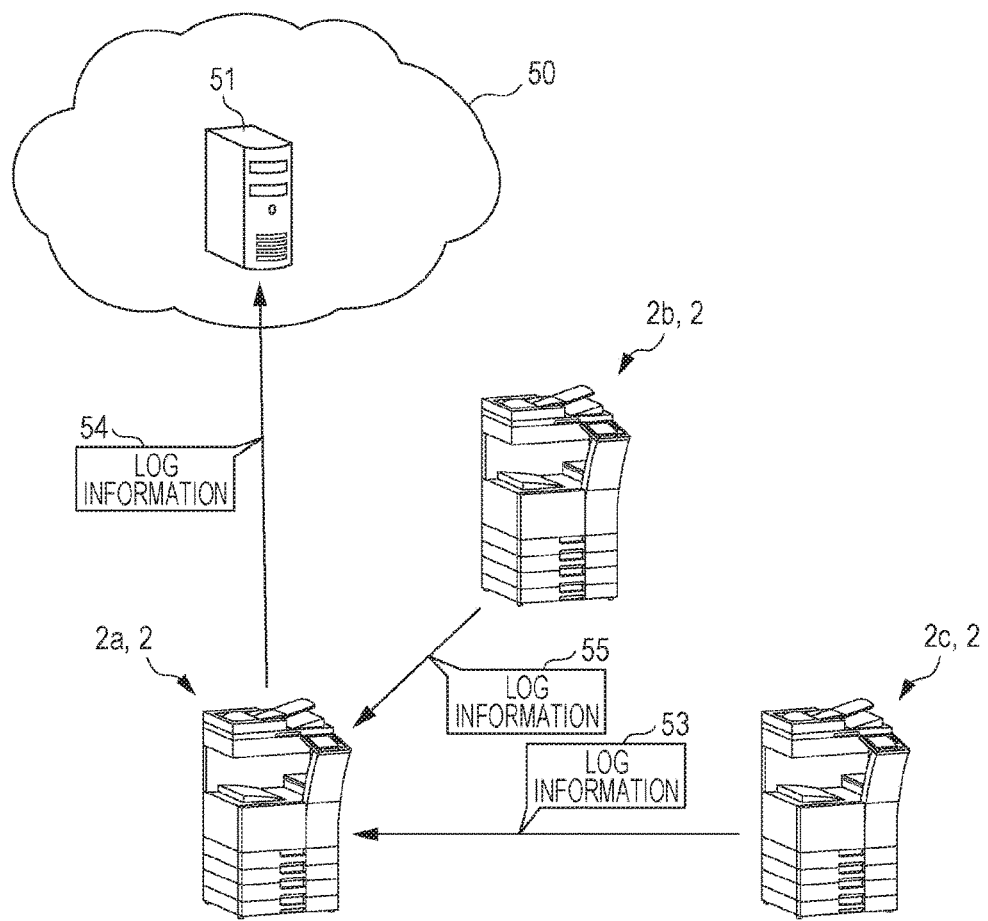
FIG. 21 is a diagram for describing an operation example in the case where a representative device is switched.

FIG. 21 is a diagram for describing an example in which the image processing device 2a is operated as the representative device. When the image processing device 2a is operated as the representative device, the image processing device 2a monitors timing to transmit the log information to the cloud server 51. Even in the case where the image processing device 2a is operated as the representative device, the point to collect the log information from a predetermined client device 4 at predetermined timing is unchanged. Then, when having detected the timing to transmit the log information to the cloud server 51, the image processing device 2a acquires the log information 53 from the image processing device 2c and log information 55 from the image processing device 2b. Then, the image processing device 2a generates the log information 54 that is the bound log information 53 and 55 collected from the image processing devices 2b and 2c and log information collected from the image processing device 2b, and transmits the log information 54 to the cloud server 51. That is, the image processing device 2a is operated as the representative device on behalf of the image processing device 2b because of the expanded log collection function, thereby to more efficiently transmit the log information 54 to the cloud server 51 than the image processing device 2b.

Figure 22:
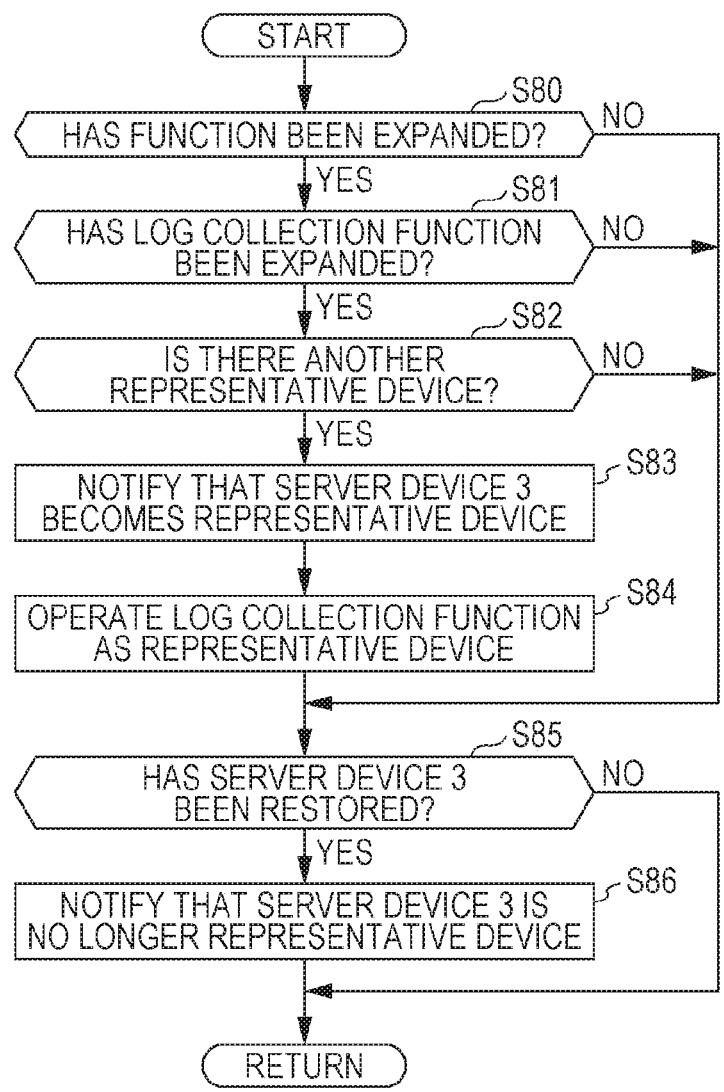
FIG. 22 is a flowchart illustrating an example of a processing procedure in a server device according to a fourth embodiment.

FIG. 22 is a flowchart illustrating an example of a processing procedure in the server device 3 according to the present embodiment. When starting the processing, the server device 3 determines whether the server function has been expanded due to the occurrence of a failure or the transition to a power saving mode (step S80). In the case where the server function has been expanded (YES in step S80), the server device 3 determines whether the log collection function has been expanded (step S81). In the case where the log collection function has been expanded (YES in step S81), the server device 3 determines whether there is another representative device that uploads log information to the cloud server 51 (step S82). As a result, in the case where another server device 3 is operated as the representative device (YES in step S82), the server device 3 notifies the other server device 3 that the server device 3 becomes the representative device (step S83). With the notification, the former representative device stops the operation as the representative device. Further, the other server device 3 transmits the log information collected from the client device 4 to the server device 3 that has newly become the representative device on the basis of a request from the server device 3 that has newly become the representative device. Then, the server device 3 operates the expanded log collection function as the representative device (step S84). In the case where the server device 3 has not expanded the log collection function (NO in step S80 or S81), or in the case where there is no other representative devices (NO in step S82), the server device 3 skips the processing of steps S83 and S84.

Next, the server device 3 determines whether the basic function of the server device 3 has been restored (step S85). In the case where the basic function of the server device 3 has been restored (YES in step S85), the server device 3 notifies other server devices 3 that the server device 3 becomes no longer the representative device (step S86). With the notification, the original server device 3 set as the representative device becomes operated as the representative device again. In the case where the basic function of the server device 3 has not been restored (NO in step S85), the processing of step S86 is skipped.

When the server device 3 expands the log collection function, of the server functions, the server device 3 becomes operated as the representative device, and can efficiently perform processing of uploading the log information 54 to the cloud server 51, by repeatedly performing the above processing.

Note that matters other than the points described in the present embodiment are similar to those described in the first to third embodiments.

(Modification)

Several embodiments regarding the present invention have been described. However, the present invention is not limited to the contents described in the above embodiments, and various modifications are applicable.

For example, in the above embodiment, the case in which the plurality of CPUs 21*a*, 21*b*, 21*c*, and 21*d* is provided in the control unit 10 of the server device 3, and the basic functions and the server functions are distributed and assigned to the plurality of CPUs 21*a*, 21*b*, 21*c*, and 21*d* in the normal operation state has been described. However, the control unit 10 of the server device 3 does not necessarily include a plurality of CPUs, and may be constituted by one CPU. In this case, the basic functions and the server functions are assigned to the one CPU, and processing based on the functions is performed by the one CPU. Then when the basic function becomes inoperable due to occurrence of a failure or transition to a power saving mode, processing related to the basic function is released from the CPU and processing related to the server function may just be additionally performed in the CPU.

Further, in the above-described embodiment, the case in which the plurality of server device 3 is provided in the image processing system 1 has been described as an example. However, an embodiment is not limited to the case. That is, at least one server device 3 is provided in the image processing system 1.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing device capable of assigning a basic function and a server function to hardware resources and operating the basic function and the server function, the image processing device comprising:
    a hardware processor that:
    detects occurrence of a failure related to the basic function or transition to a power saving mode;
    releases a specific hardware resource corresponding to a function that has become inoperable due to the occurrence of a failure or the transition to a power saving mode, of the basic function assigned to the hardware resources, in a case where the occurrence of a failure or the transition to a power saving mode has been detected by the hardware processor, and
    additionally assigns the server function to the specific hardware resource released by the hardware processor, of the hardware resources, to operate the server function.

2. The image processing device according to claim 1, wherein the hardware processor notifies another first image processing device connected via a network and using the server function that the server function has been expanded, with the additional assignment of the server function to the specific hardware resource.

3. The image processing device according to claim 1, wherein the hardware processor releases, in a case where restoration from the failure or the power saving mode has been detected by the hardware processor, the server function additionally assigned to the specific hardware resource, and reassigns the function that has become operable due to the restoration from the failure or the power saving mode to the specific hardware resource.

4. The image processing device according to claim 1, wherein the hardware processor:
    predicts a restoration time required for restoration from the failure or the power saving mode in the case where the occurrence of the failure related to the basic function or the transition to the power saving mode has been detected by the hardware processor;
    predicts a processing time in the server function in the state where the server function is additionally assigned to the specific hardware resource by the hardware processor; and
    receives, when receiving a processing request to the server function, the processing request on a condition that the processing time is shorter than the restoration time required in the state where the server function is additionally assigned to the specific hardware resource by the hardware processor.

5. The image processing device according to claim 4, wherein the hardware processor predicts the restoration time required for restoration from the failure by reference to a table in which the restoration time required is defined in advance for each type of failure.

6. The image processing device according to claim 1, wherein
    the basic function includes a print function,
    the hardware processor detects toner empty, paper jam, or sheet empty, as a failure related to the print function, and in a case where the failure related to the print function has been detected by the hardware processor, the hardware processor releases the print function assigned to the hardware resource.

7. The image processing device according to claim 1, wherein
the basic function includes a scan function,
the hardware processor detects paper jam of a document, as a failure related to the scan function, and
in a case where the failure related to the scan function has been detected by the hardware processor, the hardware processor releases the scan function assigned to the hardware resource.

8. The image processing device according to claim 1, wherein
the hardware resource includes a memory,
the hardware processor releases a memory area secured for the function that has become inoperable due to the occurrence of a failure or the transition to a power saving mode, and
the hardware processor expands information to be used by the server function to the memory area.

9. The image processing device according to claim 1, wherein
the hardware resource includes a CPU,
the hardware processor releases processing performed in the CPU for the function that has become inoperable due to the occurrence of a failure or the transition to a power saving mode, and
the hardware processor makes occupancy of processing by the server function in the CPU high.

10. The image processing device according to claim 1, wherein the server function is an authentication function to perform authentication on the basis of an authentication request from an outside.

11. The image processing device according to claim 1, forming a server device group with another second image processing device having the server function, wherein the hardware processor:
determines an image processing device serving as a priority access destination from the server device group in a case of having received a notification notifying that the server function has been expanded from the other second image processing device; and
instructs an image processing device serving as a client device using the server function to set the image processing device serving as the priority access destination as a transmission source of a processing request.

12. The image processing device according to claim 1, wherein
the server function includes a plurality of functions, and
when the hardware processor additionally assigns the server function to the specific hardware resource after receiving a notification notifying that the server function has been expanded from another image processing device, the hardware processor assigns a function different from the function expanded in the other image processing device.

13. The image processing device according to claim 1, wherein
the server function is a function in which one of a plurality of image processing devices serves as a representative device and collects log information from the other image processing devices and transmits the log information to a predetermined cloud server, and
when the occurrence of a failure or the transition to a power saving mode has been detected by the hardware processor and the specific hardware resource has been released by the hardware processor, the hardware processor assigns the function to collect the log information from the other image processing devices and transmit the log information to the cloud server as the representative device to the specific hardware resource.

14. An image processing system including a server device group including a plurality of image processing devices operated as server devices having a server function, and a client device that is an image processing device that accesses at least one image processing device of the server device group and uses the server function, wherein
the server device includes
hardware resources to which a basic function and a server function are assigned and in which the basic function and the server function are operable, and
a hardware processor that:
detects occurrence of a failure related to the basic function or transition to a power saving mode;
releases a specific hardware resource corresponding to a function that has become inoperable due to the occurrence of a failure or the transition to a power saving mode, of the basic function assigned to the hardware resources, in a case where the occurrence of a failure or the transition to a power saving mode has been detected by the hardware processor, and
additionally assigns the server function to the specific hardware resource released by the hardware processor, of the hardware resources, and transmits a notification notifying that the server function has been expanded to the client device, and
the client device
accesses a server device with the expanded server function on the basis of the notification notifying that the server function has been expanded.

15. The image processing system according to claim 14, wherein, when one server device of the server device group is operated as a representative device, the hardware processor notifies the representative device that the server function has been expanded, and performs notification to the client device via the representative device.

16. The image processing system according to claim 14, wherein, in a case where a notification notifying that the server function has been expanded is received from two or more server devices of the server device group, the client device accesses a server device with a longest restoration time required for restoration from the failure or the power saving mode, of the two or more server devices.

17. A non-transitory recording medium storing a computer readable program executed in an image processing device capable of assigning a basic function and a server function to hardware resources and operating the basic function and the server function, the program causing the image processing device to execute:
detecting occurrence of a failure related to the basic function or transition to a power saving mode;
releasing a specific hardware resource corresponding to a function that has become inoperable due to the occurrence of a failure or the transition to a power saving mode, of the basic function assigned to the hardware resources, in a case where the occurrence of a failure or the transition to a power saving mode has been detected in the detecting; and
additionally assigning the server function to the specific hardware resource released in the releasing, of the hardware resources, to operate the server function.

18. The non-transitory recording medium storing a computer readable program according to claim 17, wherein the assigning notifies another first image processing device connected via a network and using the server function that the server function has been expanded, with the additional assignment of the server function to the specific hardware resource.

19. The non-transitory recording medium storing a computer readable program according to claim 17, the program causing the image processing device to further execute:
releasing, in a case where restoration from the failure or the power saving mode has been detected in the detecting, the server function additionally assigned to the specific hardware resource, and reassigning the function that has become operable due to the restoration from the failure or the power saving mode to the specific hardware resource.

20. The non-transitory recording medium storing a computer readable program according to claim 17, the program causing the image processing device to further execute:
predicting a restoration time required for restoration from the failure or the power saving mode in the case where the occurrence of the failure related to the basic function or the transition to the power saving mode has been detected in the detecting;
predicting a processing time in the server function in the state where the server function is additionally assigned to the specific hardware resource in the assigning, and
receiving, when receiving a processing request to the server function, the processing request on a condition that the processing time is shorter than the restoration time required in the state where the server function is additionally assigned to the specific hardware resource in the assigning.

21. The non-transitory recording medium storing a computer readable program according to claim 20, wherein the predicting predicts the restoration time required for restoration from the failure by reference to a table in which the restoration time required is defined in advance for each type of failure.

22. The non-transitory recording medium storing a computer readable program according to claim 17, wherein
the basic function includes a print function,
the detecting detects toner empty, paper jam, or sheet empty, as a failure related to the print function, and
in a case where the failure related to the print function has been detected in the detecting, the releasing releases the print function assigned to the hardware resource.

23. The non-transitory recording medium storing a computer readable program according to claim 17, wherein
the basic function includes a scan function,
the detecting detects paper jam of a document, as a failure related to the scan function, and
in a case where the failure related to the scan function has been detected in the detecting, the releasing releases the scan function assigned to the hardware resource.

24. The non-transitory recording medium storing a computer readable program according to claim 17, wherein
the hardware resource includes a memory,
the releasing releases a memory area secured for the function that has become inoperable due to the occurrence of a failure or the transition to a power saving mode, and
the assigning expands information to be used by the server function to the memory area.

25. The non-transitory recording medium storing a computer readable program according to claim 17, wherein
the hardware resource includes a CPU,
the releasing releases processing performed in the CPU for the function that has become inoperable due to the occurrence of a failure or the transition to a power saving mode, and
the assigning makes occupancy of processing by the server function in the CPU high.

26. The non-transitory recording medium storing a computer readable program according to claim 17, wherein the server function is an authentication function to perform authentication on the basis of an authentication request from an outside.

27. The non-transitory recording medium storing a computer readable program according to claim 17, the program causing the image processing device to further execute:
determining, in a case of having received a notification notifying that a server function has been expanded from another image processing device, a priority access destination from a plurality of image processing devices including the other image processing device and the image processing device; and
instructing, in a case of having received a processing request from an outside, the priority access destination determined in the determining as a transmission source of the processing request.

28. The non-transitory recording medium storing a computer readable program according to claim 17, wherein
the server function includes a plurality of functions, and
when the assigning additionally assigns the server function to the hardware resource after receiving a notification notifying that the server function has been expanded from another image processing device, the assigning assigns a function different from the function expanded in the other image processing device.

29. The non-transitory recording medium storing a computer readable program according to claim 17,
the server function is a function in which one of a plurality of image processing devices serves as a representative device and collects log information from the other image processing devices and transmits the log information to a predetermined cloud server, and
when the occurrence of a failure or the transition to a power saving mode has been detected in the detecting and the hardware resource has been released in the releasing, the assigning assigns the function to collect the log information from the other image processing devices and transmit the log information to the cloud server as the representative device to the hardware resource.

* * * * *